United States Patent
Yu et al.

(10) Patent No.: US 12,321,291 B2
(45) Date of Patent: Jun. 3, 2025

(54) MEMORY CONTROLLER, SYSTEM, AND METHOD OF SCHEDULING MEMORY ACCESS EXECUTION ORDER BASED ON LOCALITY INFORMATION

(71) Applicant: SAMSUNG ELECTRONICS CO., LTD., Suwon-si (KR)

(72) Inventors: Jaehwan Yu, Suwon-si (KR); Wooseong Cheong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/353,258

(22) Filed: Jul. 17, 2023

(65) Prior Publication Data

US 2024/0168896 A1 May 23, 2024

(30) Foreign Application Priority Data

Nov. 22, 2022 (KR) .................... 10-2022-0157639

(51) Int. Cl.
  *G06F 13/16* (2006.01)
(52) U.S. Cl.
  CPC ...... *G06F 13/1689* (2013.01); *G06F 13/1626* (2013.01)
(58) Field of Classification Search
  CPC ............. G06F 13/1626; G06F 13/1605; G06F 13/1689; G06F 13/1642
  USPC ........................................ 711/151, 154, 158
  See application file for complete search history.

(56) References Cited

U.S. PATENT DOCUMENTS

| | | | |
|---|---|---|---|
| 6,983,350 B1 | 1/2006 | Wheeler et al. | |
| 10,203,908 B2 | 2/2019 | Oh | |
| 10,360,156 B2 | 7/2019 | Yun et al. | |
| 10,684,796 B2 | 6/2020 | Kim | |
| 11,010,295 B2 | 5/2021 | Anderson et al. | |
| 11,036,425 B2 | 6/2021 | Lee et al. | |
| 11,068,408 B2 | 7/2021 | Kim | |
| 11,194,520 B2 | 12/2021 | Kim | |
| 11,301,150 B2 | 4/2022 | Kang | |
| 11,366,763 B2 | 6/2022 | Kim | |
| 2011/0161554 A1 | 6/2011 | Selinger et al. | |

(Continued)

FOREIGN PATENT DOCUMENTS

KR  10-2020-0104601  9/2020

OTHER PUBLICATIONS

Extended European search report dated Feb. 8, 2024 from the European Patent Office in corresponding European Patent Application No. 23192490.3.

*Primary Examiner* — Than Nguyen

(74) *Attorney, Agent, or Firm* — MORGAN, LEWIS & BOCKIUS LLP

(57) ABSTRACT

An electronic system includes a plurality of master devices, a memory controller and a memory device. The master devices generate requests for memory access operations, where each request includes locality information indicating whether requests are to be executed continuously. The memory controller receives the requests from the plurality of master devices, determines an execution order of the requests based on the locality information, and sequentially generates commands to perform the memory access operations according to the execution order. The memory device receives the commands from the memory controller and performs the memory access operations based on the commands.

20 Claims, 26 Drawing Sheets

(56) References Cited

U.S. PATENT DOCUMENTS

| | | | |
|---|---|---|---|
| 2015/0046662 A1* | 2/2015 | Heinrich | G06F 13/1626 |
| | | | 711/151 |
| 2016/0133306 A1 | 5/2016 | Shen et al. | |
| 2016/0371024 A1 | 12/2016 | Park et al. | |
| 2017/0249104 A1* | 8/2017 | Moon | G06F 3/0673 |
| 2018/0285286 A1* | 10/2018 | Srikanth | G11C 7/1072 |
| 2020/0278941 A1* | 9/2020 | Bavishi | G06F 13/1642 |
| 2021/0232343 A1 | 7/2021 | Kim | |
| 2021/0311879 A1 | 10/2021 | Kang | |

* cited by examiner

FIG. 7

| CMD | CKE | | CS_n | ACT_n | RAS_n /A16 | CAS_n /A15 | WE_n /A14 | BG0-BG1 | BA0-BA1 | C2-C0 | A12 /BC_n | A17, A13, A11 | A10 /AP | A0-A9 |
|---|---|---|---|---|---|---|---|---|---|---|---|---|---|---|
| | EG1 | EG2 | | | | | | | | | | | | |
| PRE | H | H | L | H | L | H | L | BG | BA | V | V | V | L | V |
| PREA | H | H | L | H | L | H | L | V | V | V | V | V | H | V |
| ACT | H | H | L | L | ROW ADDRESS(RA) | | | BG | BA | V | ROW ADDRESS(RA) | | | |
| WR | H | H | L | H | H | L | L | BG | BA | V | V | V | L | CA |
| RD | H | H | L | H | H | L | H | BG | BA | V | V | V | L | CA |

FIG. 12B

| PORT | BIT SIZE | I/O | DESCRIPTION |
|---|---|---|---|
| RDY | 1 | INPUT | RDY is activated whenever SL is ready to receive DT |
| VLD | 1 | OUTPUT | VLD is activated when MS is ready to send PKT |
| DT | 64 | OUTPUT | PKT is divided into 64b-bit slices and each slice is sent via interface |
| LST | 1 | OUTPUT | LST is activated with VLD when last slice is to be sent |

MEMORY CONTROLLER, SYSTEM, AND METHOD OF SCHEDULING MEMORY ACCESS EXECUTION ORDER BASED ON LOCALITY INFORMATION

CROSS-REFERENCE TO RELATED APPLICATION

This U.S. non-provisional application claims priority under 35 USC § 119 to Korean Patent Application No. 10-2022-0157639, filed on Nov. 22, 2022, in the Korean Intellectual Property Office (KIPO), the disclosure of which is incorporated by reference herein in its entirety.

1. TECHNICAL FIELD

Example embodiments relate generally to semiconductor integrated circuits, and more particularly to a memory controller, an electronic system including a memory controller and a method of controlling memory access.

2. DISCUSSION OF RELATED ART

Semiconductor memory devices for storing data may be classified into volatile memory devices and nonvolatile memory devices. Memory cells of the volatile memory devices may be charged or discharged to store data. However, the stored data may be lost when power is no longer applied. Nonvolatile memory devices, such as flash memory devices, retain data stored therein even when power is no longer applied. Volatile memory devices are widely used as main memories, and nonvolatile memory devices are widely used for storing program code and/or data.

Electronic systems that include a semiconductor memory device may have a direct memory access function for the memory device. A device having the direct memory access function may be referred to as a direct memory access device or a master device. Direct memory access refers to exchanging data with a memory device without the data passing through a processor such as a central processing unit (CPU). However, efficiency of a memory device may be reduced by master devices having such a direct memory access function.

SUMMARY

Some example embodiments may provide a memory controller, an electronic system including a memory controller and a method of controlling memory access, capable of increasing efficiency of a memory device.

According to an example embodiment, an electronic system includes a plurality of master devices, a memory controller and a memory device. The plurality of master devices generate requests for memory access operations, where each request includes locality information indicating whether requests are to be executed continuously. The memory controller receives the requests from the plurality of master devices, determines an execution order of the requests based on the locality information, and sequentially generates commands to perform the memory access operations according to the execution order. The memory device receives the commands from the memory controller and performs the memory access operations based on the commands.

According to an example embodiment, a memory controller includes a first request queue configured to receive first requests transferred from a first master device and store the first requests, the first requests including first locality information indicating whether some of the first requests are to be executed continuously, a second request queue configured to receive second requests transferred from a second master device and store the second requests, the second requests including second locality information indicating whether some of the second requests are to be executed continuously, and a request arbitration circuit configured to receive some of the first requests output from the first request queue and some of the second requests output from the second request queue and sequentially output the requests that are received by the request arbitration circuit such that the output requests corresponding to a same row address of the memory device are executed continuously.

According to an example embodiment, a method of controlling memory access, includes: generating, by a plurality of master devices, requests for memory access operations, each request including locality information indicating whether requests are to be executed continuously; determining, by a memory controller, an execution order of the requests received from the plurality of master devices based on the locality information; sequentially generating, by the memory controller, commands to perform the memory access operations according to the execution order; and performing, by a memory device, the memory access operations based on the commands received from the memory controller.

The memory controller, the electronic system and the method of controlling memory access according to example embodiments may reduce additional resources of the memory device, increase efficiency of the memory device and increase performance of the memory device and the electronic system including the memory device, by determining the execution order of the requests based on the locality information.

BRIEF DESCRIPTION OF THE DRAWINGS

Example embodiments of the present disclosure will be more clearly understood from the following detailed description taken in conjunction with the accompanying drawings.

FIG. 7 is a diagram illustrating examples of commands that are transferred in the memory system of FIG. 6.

FIGS. 12A, 12B and 12C are diagrams illustrating an example embodiment of transaction performed by a memory controller according to example embodiments.

DETAILED DESCRIPTION OF THE EMBODIMENTS

Figure 1:
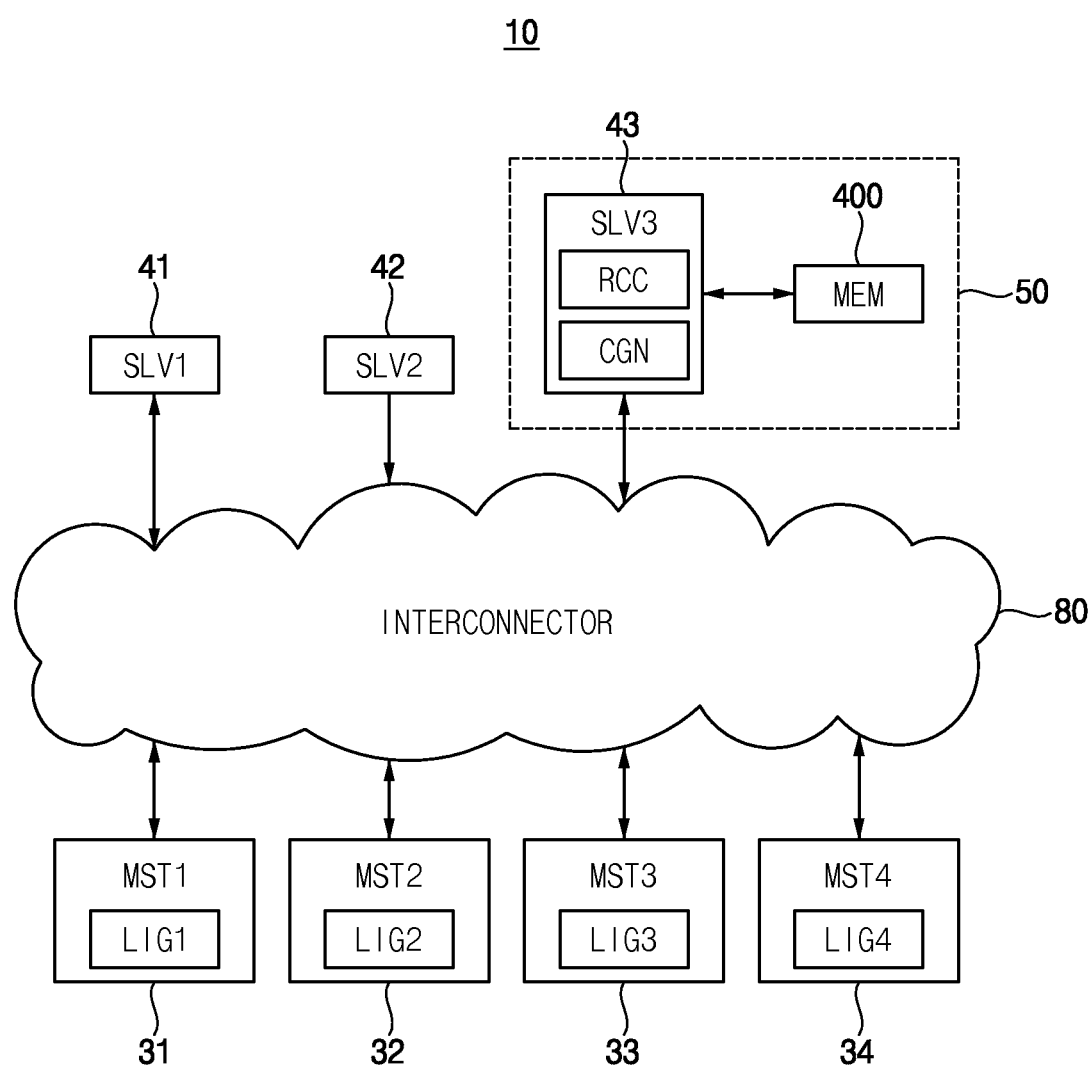
FIG. 1 is a conceptual diagram illustrating an electronic system according to an example embodiment.

Various example embodiments will be described more fully hereinafter with reference to the accompanying drawings, in which some example embodiments are shown. In the drawings, like numerals refer to like elements throughout. The repeated descriptions may be omitted.

FIG. 1 is a conceptual diagram illustrating an electronic system according to an example embodiment.

Referring to FIG. 1, an electronic system 10 may include a plurality of master devices (MST1~MST4) 31, 32, 33 and 34, a plurality of slave devices (SLV1~SLV3) 41, 42 and 43, and an interconnect device 80. While FIG. 1 illustrates four master devices and three slave devices, the inventive concept is not limited thereto. For example, the numbers of the master devices and the slave devices in the electronic system 10 may be adjusted to various numbers different from those illustrated.

The master devices 31, 32, 33 and 34 may generate requests to demand services from at least one of the slave devices 41, 42 and 43, respectively. For example, each of the master devices 31, 32, 33 and 34 may generate a request signal and send the same through the interconnect device 80 to at least one of the slave devices 41, 42 and 43. For example, the request signal may include information used by the corresponding slave device to determine the type of service requested. The master devices 31, 32, 33 and 34 and the slave devices 41, 42 and 43 may be connected to the interconnect device 80 through respective channels. The interconnect device 80 may perform an arbitrating operation on the requests based on priority information and may control request flows between the master devices 31, 32, 33 and 34 and the slave devices 41, 42 and 43 based on a result of the arbitrating operation. Example embodiments of the electronic system 10 will be further described below with reference to FIGS. 4, 13, 19 and 20.

At least one slave device, for example, the slave device 43 may be a memory controller. The memory controller 43 may be connected to a memory device 400, and the memory controller 43 and the memory device 400 may form a memory system 50.

The master devices 31, 32, 33 and 34 may be direct memory access devices that generate requests to demand memory access operations to the memory device 400. Here, the memory access operations may include write operations to store data in the memory device 400 and read operations to read out data from the memory device 400.

The memory controller 43 may include a command generator CGN (e.g., a command generator circuit) that generates commands for performing the memory access operations based on the requests received from the plurality of master devices 31, 32, 33 and 34. The memory device 400 may perform the memory access operations based on the commands received from the memory controller 43.

According to an example embodiment, the plurality of master devices 31, 32, 33 and 34 may include locality information generators LIG1, LIG2, LIG3 and LIG4 (e.g., generator circuits), respectively, and the memory controller 43 may include a request control circuit RCC. Each of the locality information generators LIG1, LIG2, LIG3 and LIG4 and the request control circuit RCC may be implemented as hardware, software, or a combination thereof.

FIG. 1 shows that all master devices 31, 32, 33, and 34 include the locality information generators. In some example embodiments, some master devices may not have a direct memory access function, and the master devices without the direct memory access function need not include the locality information generators.

Figure 2:
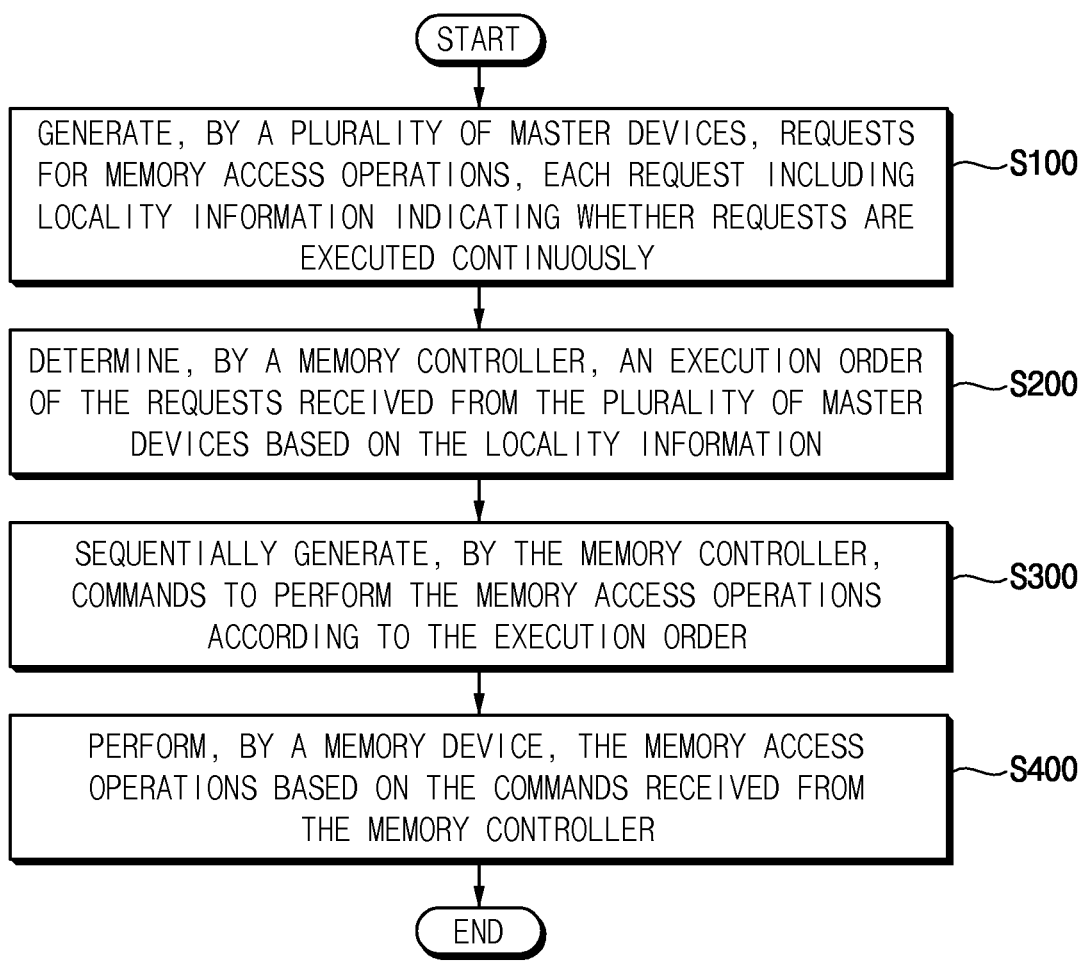
FIG. 2 is a flowchart illustrating a method of controlling memory access according to an example embodiment.

FIG. 2 is a flowchart illustrating a method of controlling memory access according to an example embodiment.

Referring to FIGS. 1 and 2, the plurality of master devices 31, 32, 33 and 34 generate requests for memory access operations such that each request includes locality information indicating whether the requests are to be executed continuously (S100). In this disclosure, "continuous execution" of the requests refers to no execution of other intervening requests. For example, the continuous execution of two requests may indicate that another request is not executed before the execution of the two requests has completed. For example, if the first master device 31 requests first and second continuous writes to the memory device 400 and the second master device 32 requests third and fourth continuous writes to the memory device 400, a continuation execution would include the first write immediately followed by the second write without the third write or the fourth write occurring between the first and second writes.

Each locality information generator LIGi (i=1, 2, 3, 4) generates the locality information by determining whether the requests generated by each master device MSTi require the continuous execution. Here, the continuous execution may result in an increase in efficiency of the memory device 400 due to the continuous execution of requests. In some example embodiments, the continuous execution may be required when the row addresses included in the requests for the memory access operations are the same or continuous. For example, continuous row addresses may include those that are sequential to one another. casein an embodiment, each locality information generator LIGi generates the locality information based on the row addresses included in the requests that are generated by the corresponding master device MSTi.

The request control circuit RCC of the memory controller 43 determines an execution order of the requests received from the plurality of master devices 31, 32, 33 and 34 based on the locality information (S200). The execution order of the requests may be determined such that the efficiency of the memory device 400 may be increased. Example embodiments of determining the execution order based on the locality information will be described below with reference to FIG. 11, etc.

The command generator CGN of the memory controller 43 sequentially generates commands to perform the memory access operations according to the determined execution order (S300). Example embodiments of generating the commands according to the execution order will be described below with reference to FIGS. 9A, 9B, etc.

The memory device 400 performs the memory access operations based on the commands received from the memory controller 43 (S400). Example embodiments of configuration and operation of the memory device 400 will be described below with reference to FIGS. 15A through 17.

As such, the memory controller 43, the electronic system 10 and the method of controlling memory access according to example embodiments may reduce additional resources of the memory device 400, increase efficiency of the memory device 400 and increase performance of the memory device 400 and the electronic system 10 including the memory device 400, by determining the execution order of the requests based on the locality information.

Figure 3A:
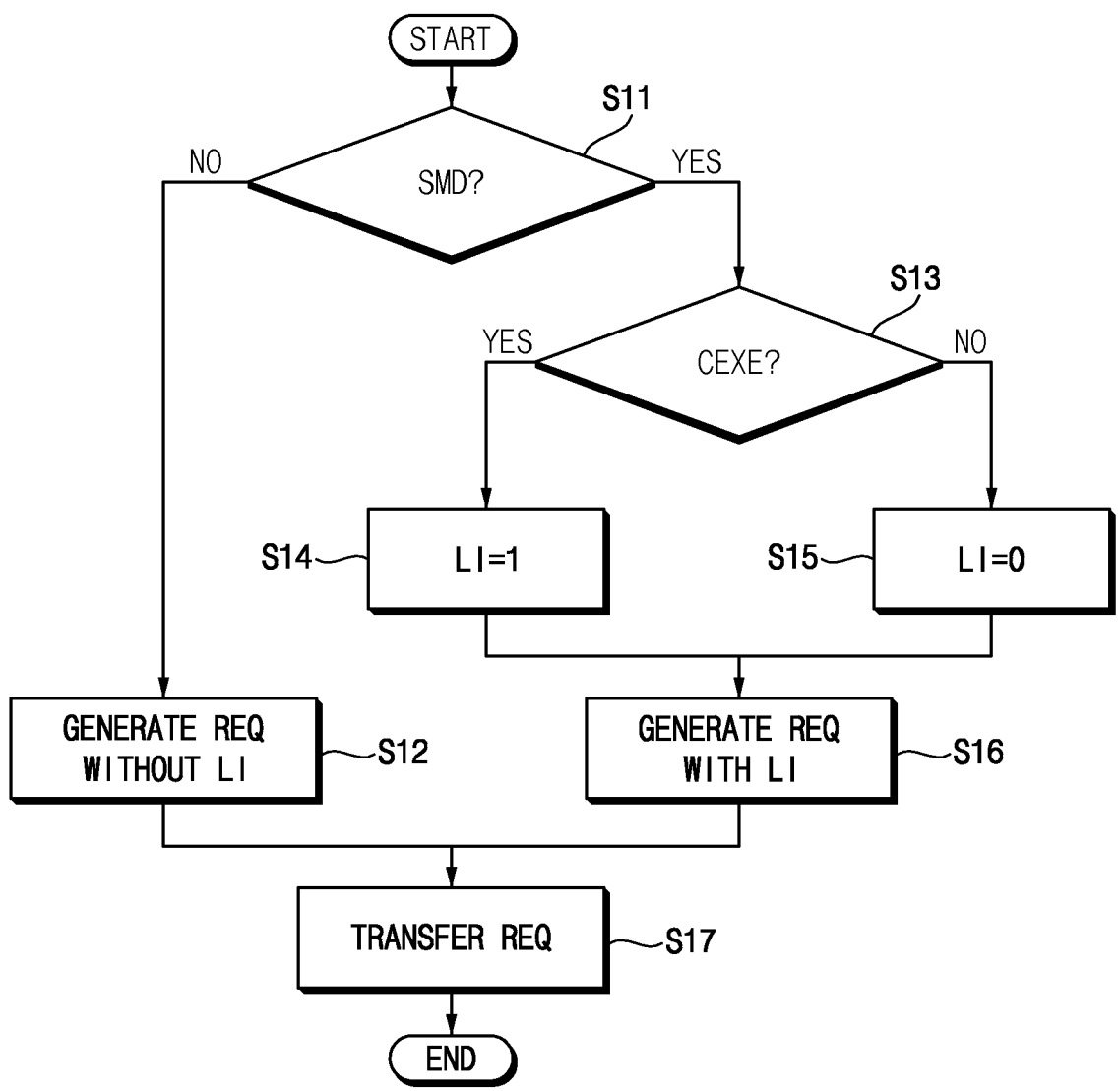
FIGS. 3A and 3B are flowcharts illustrating operations of a master device and a memory controller included in an electronic system according to example embodiments.
Figure 3B:
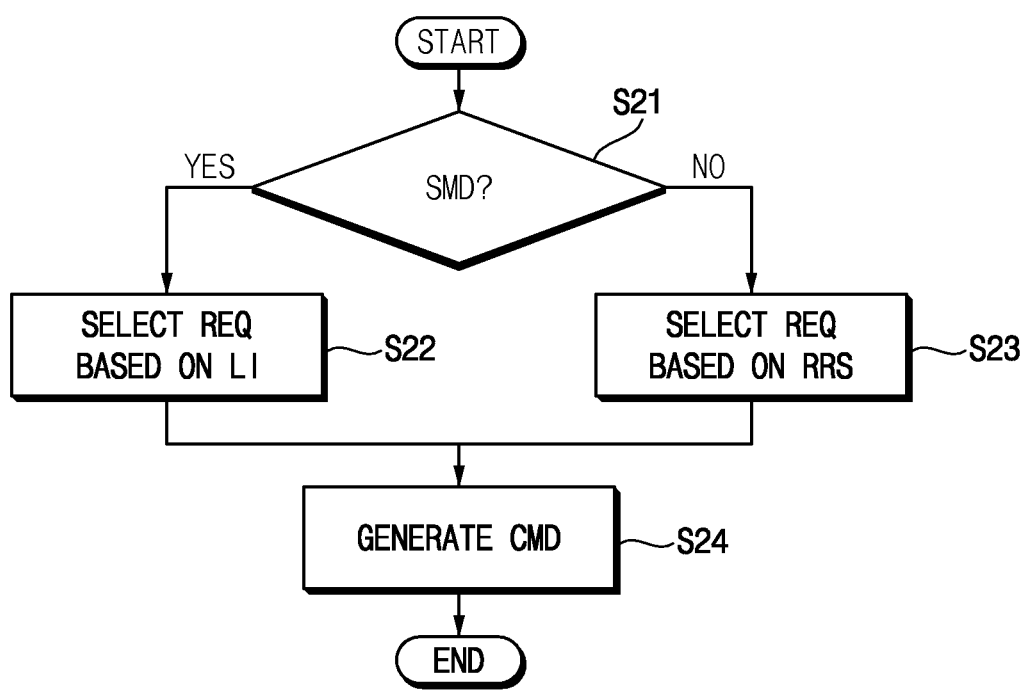

FIGS. 3A and 3B are flowcharts illustrating operations of a master device and a memory controller included in an electronic system according to example embodiments.

FIG. 3A illustrates an operation of generating each request in each master device having a direct memory access function, and FIG. 3B illustrates an operation of generating commands by selecting one of the requests received from the plurality of master devices in the memory controller.

Referring to FIGS. 1 and 3A, the master device MSTi (i=1, 2, 3, 4) determines whether a present operation mode is a sequential mode SMD (S11). The present operation mode may be determined by a main processor (e.g., a CPU, a host processor, etc.) that controls the overall operations of the electronic system 10. The main processor may be one of a plurality of master devices 31, 32, 33 and 34. In an embodiment, the present operation mode is transferred from the main processor to the master devices 31, 32, 33 and 34 and the memory controller 43 in the electronic system 10, and the present operation mode may be stored, as mode information, in an internal status register included in the master devices 31, 32, 33 and 34 and the memory controller 43.

When the present operation mode is not the sequential mode SMD (S11: NO), that is, when the present operation mode is the normal mode NMD, the master device MSTi generates a request REQ that does not include the locality information LI (S12), and transfers the request REQ without the locality information LI to the memory controller 43 through the interconnection device 80 (S17).

When the present operation mode is the sequential mode SMD (S11: YES), the master device MSTi generates a request REQ including the locality information LI (S16), and transfers the request REQ including the locality information LI to the memory controller 43 through the interconnection device 80 (S17).

In some example embodiments, as shown in FIG. 3A, the locality information generator LIGi of the master device MSTi may determine whether continuous execution CEXE of the requests is required (S13). When the continuous execution CEXE is required (S13: YES), the locality information generator LIGi may set the locality information LI to a first value (e.g., a value of "1"). On the other hand, when continuous execution CEXE is not required (S13: NO), the locality information generator LIGi may set the locality information LI to a second value (e.g., a value of "0").

Referring to FIGS. 1 and 3B, the memory controller 43 determines whether the present operation mode is the sequential mode SMD (S21). When the present operation mode is the sequential mode SMD (S21: YES), the request control circuit RCC of the memory controller 43 selects the request REQ that is to be performed next based on the locality information LI included in the request REQ that is performed presently (S22), and generates a command CMD corresponding to the selected request REQ (S24). When the present operation mode is not the sequential mode SMD (S21: NO), that is, when the present operation mode is the normal mode NMD, the request control circuit RCC selects a request REQ that is to be performed next based on a predetermined method (e.g., a round robin scheme (RRS)) (S23), and generates a command CMD corresponding to the selected request REQ (S24). For example, if a first request from the first master device 31 just completed, a round robin scheme could then generate a command CMD corresponding to a second request from the second master device 32.

As such, the memory controller 43 may operate selectively in the sequential mode SMD in which the execution order of requests is determined based on the locality information LI or in the normal mode NMD in which the execution order of requests is determined regardless of the locality information LI. For example, in the normal mode NMD, the execution order is determined without considering the locality information LI.

Each master device MSTi, with respect to two requests that are generated sequentially, that is, with respect to a preceding request and a succeeding request, may determine the value of the locality information LI included in the preceding request based on whether the continuous execution of the preceding request and the succeeding request is required. For example, when the preceding request and the succeeding request correspond to the same row address of the memory device 400, the locality information LI included in the preceding request may be set to a first value (e.g., a value of "1"), and when the preceding request and the succeeding request do not correspond to the same row address, the locality information LI included in the preceding request may be set to a second value (e.g., a value of "0").

When the locality information LI of the preceding request has the first value, the memory controller 43 may determine the execution order of requests such that the succeeding request is executed after the preceding request. On the other hand, when the locality information LI of the preceding request has the second value, the memory controller 43 may determine the execution order of requests such that a request received from another master device is executed after the preceding request. The execution order of the requests determined in this way will be described in more detail with reference to FIGS. 4 and 8.

Figure 4:
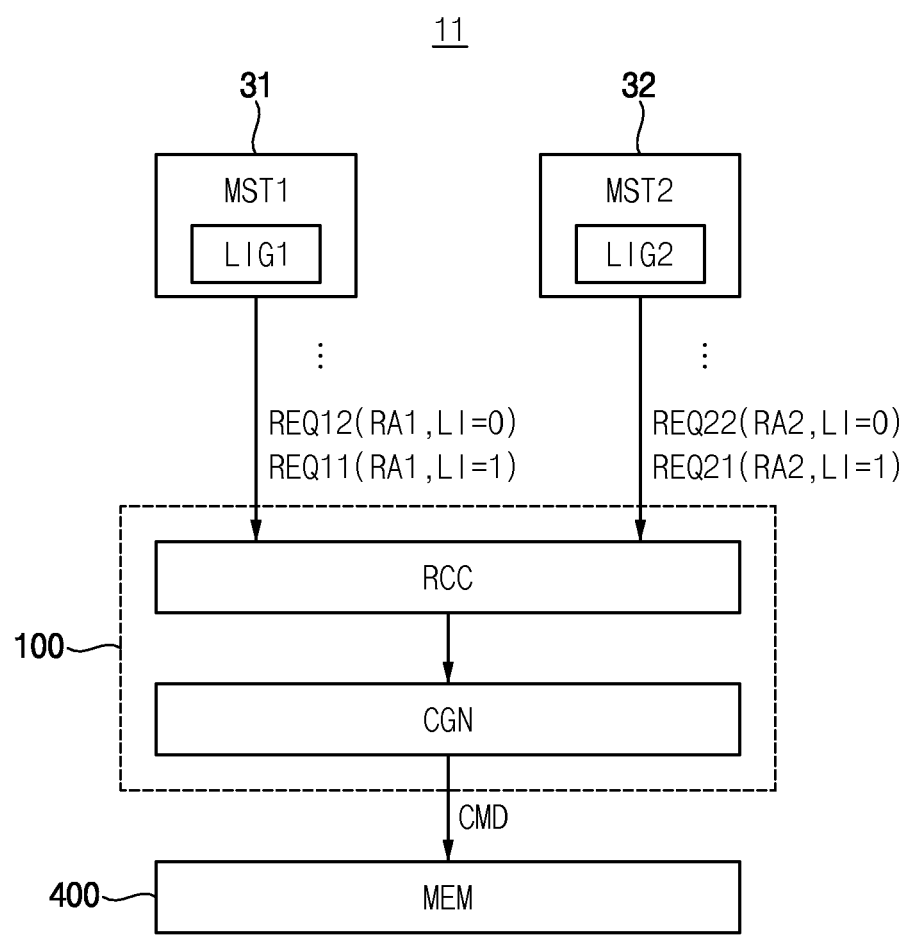
FIG. 4 is a block diagram illustrating an electronic system according to an example embodiment.

FIG. 4 is a block diagram illustrating an electronic system according to an example embodiment.

Referring to FIG. 4, an electronic system 11 may include a first master device MST1 31, a second master device MST2 32, a memory controller 100, and a memory device MEM 400. The memory controller 100 may include a request control circuit RCC and a command generator CGN.

The first master device 31 may sequentially generate and transmit a first request REQ11 and a second request REQ12 to the memory controller 100. For example, the first request REQ11 and the second request REQ12 may correspond to the same first row address RA1. In this case, the locality information LI included in the first request REQ11 may have a first value (e.g., a value of "1"), and the locality information LI included in the second request REQ12 may have a second value (e.g., a value of "0"). Therefore, the first value of the locality information LI in the first request REQ11 may indicate that it is required to continuously execute the first request REQ11 corresponding to the preceding request and the second request REQ12 corresponding to the succeeding request. In contrast, the second value of the locality information LI in the second request REQ12 may indicate that it is not required to continuously execute the second request REQ12 corresponding to the preceding request and a following request (not shown) corresponding to the succeeding request.

The second master device 32 may sequentially generate and transmit a third request REQ21 and a fourth request REQ22 to the memory controller 100. For example, the third request REQ21 and the fourth request REQ22 may correspond to the same second row address RA2. In this case, the locality information LI included in the third request REQ21 may have a first value (e.g., a value of "1"), and the locality information LI included in the fourth request REQ22 may have a second value (e.g., a value of "0"). Therefore, the first value of the locality information LI in the third request REQ21 may indicate that it is required to continuously execute the third request REQ21 corresponding to the preceding request and the fourth request REQ22 corresponding to the succeeding request. In contrast, the second value of the locality information LI in the fourth request REQ22 may indicate that it is not required to continuously execute the fourth request REQ22 corresponding to the preceding request and a following request (not shown) corresponding to the succeeding request.

The request control circuit RCC of the memory controller 100 receives the first request REQ11 and the second request REQ12 from the first master device 31, and receives the third request REQ21 and the fourth request REQ22 from the second master device 32. The request control circuit RCC may determine the execution order of requests based on the locality information LI included in the first request REQ11, the second request REQ12, the third request REQ21, and the fourth request REQ22, respectively. The request control circuit RCC may sequentially output the requests one by one according to the determined execution order. For example, since the locality information LI included in the first request REQ11 and the third request REQ21 has the first value, the request control circuit RCC may select either the first request REQ11 or the third request REQ21, determine the address of the selected request, select one of the second request REQ12 and the fourth request REQ22 having the same address, and then sequentially output the selected requests.

The command generator CGN of the memory controller 100 may sequentially generate commands CMD for the memory access operations based on the requests output from the request control circuit RCC.

The memory device 400 may receive the commands CMD sequentially transferred from the memory controller 100, and perform the memory access operations corresponding to the first request REQ11, the second request REQ12, the third request REQ21 and the fourth request REQ22 based on the sequentially received commands CMD. For example, since the locality information LI included in the first request REQ11 and the third request REQ21 has the first value, the command generator CGN could generate a first command for the first request REQ11 sequentially followed by a second command for the second request REQ12 without generating a third command for the third request REQ21 between the first and second commands.

Figure 5:
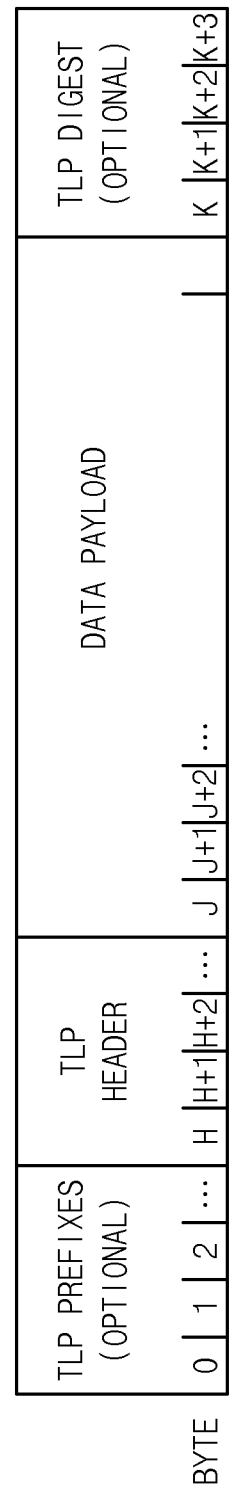
FIG. 5 is a diagram illustrating an example of a packet that is transferred in an electronic system according to an example embodiment.

FIG. 5 is a diagram illustrating an example of a packet that is transferred in an electronic system according to an example embodiment.

FIG. 5 illustrates a format of a transaction layer packet (TLP) that is generated and managed by a transaction layer of a peripheral component interconnect express (PCIe) architecture.

Transactions may include requests and completions (or responses), which are communicated using packets. As illustrated in FIG. 5, a TLP may include one or more optional TLP Prefixes, a TLP header, a data payload, and an optional TLP Digest, which are allocated to a plurality of bytes (BYTE 0~k+3).

The above-described memory access requests (REQ11, REQ12, REQ21, REQ22) for the memory access operations (write operation and read operations), the configuration requests for transferring information such as the present operation mode, etc. and the responses may correspond to the TLPs as illustrated in FIG. 5. The TLP header may include various information such as a device identifier, success information for the corresponding request and so on, and the data payload may include the data block (e.g., data to write), the logical address, the access address (e.g., the physical address), and so on.

Figure 6:
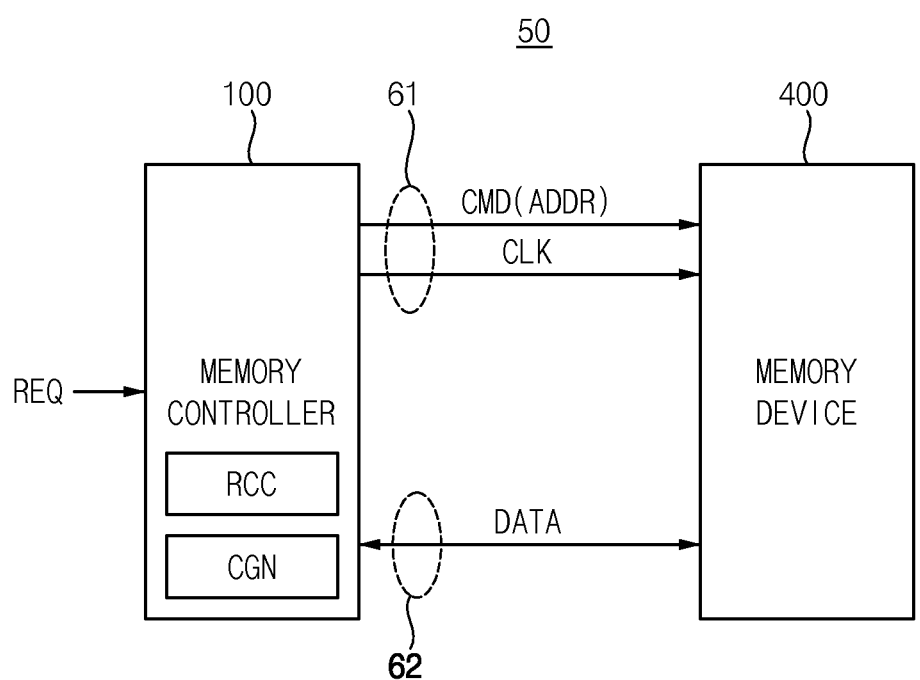
FIG. 6 is a block diagram illustrating a memory system according to an example embodiment.

FIG. 6 is a block diagram illustrating a memory system according to an example embodiment.

Referring to FIG. 6, a memory system 50 may include a memory controller 100 and a memory device 400. The memory controller 100 and the memory device 400 may communicate through a memory interface. The memory interface may include a control bus 61 for transferring a command CMD, an access address ADDR, a clock signal CLK, and the like, and a data bus 62 for transferring data.

Depending on the type of memory device 400, the command CMD may be regarded as including the access address ADDR. The memory controller 100 may generate a command signal CMD for controlling the memory device 400 and performing a write operation in which data DATA is written into the semiconductor memory device 400 under the control of the memory controller 100 or a read operation in which data DATA is read from the semiconductor memory device 400.

FIG. 7 is a diagram illustrating examples of commands that are transferred in the memory system of FIG. 6.

As an example, FIG. 7 shows some commands CMD according to a double data rate 4 (DDR4) synchronous dynamic random access memory (SDRAM) standard such as a precharge command PRE, an all-bank precharge command PREA, an activate command ACT, a write command WR, and a read command RD.

The type of the command CMD, the bank group address BG, the bank address BA, the row address RA, and the column address CA may be determined by the combinations of signals CKE, CS_n, ACT_n, RAS_n, CAS_n, WE_n, BG0-BG1, BA0-BA1, C2-C0, BC-n, and A0-A17 transmitted through the control bus 61 of FIG. 6. In FIG. 7, H represents a logic high level, L represents a logic low level, and V represents a logic low level or a logic high level. EG1 and EG2 represent the first and second rising edges of the clock signal CKE.

The activate command ACT is used to open or activate one row (i.e., a wordline) of a particular memory bank for subsequent access. The open (or activated) wordline remains active until a precharge command PRE or an all-bank precharge command PREA is issued. A memory bank must be precharged before another row in the same memory bank is opened or activated. The precharge command PRE is used to deactivate or close an open row of a specific memory bank, and the all-bank precharge command PREA is used to deactivate or close an open row of all memory banks.

Figure 8:
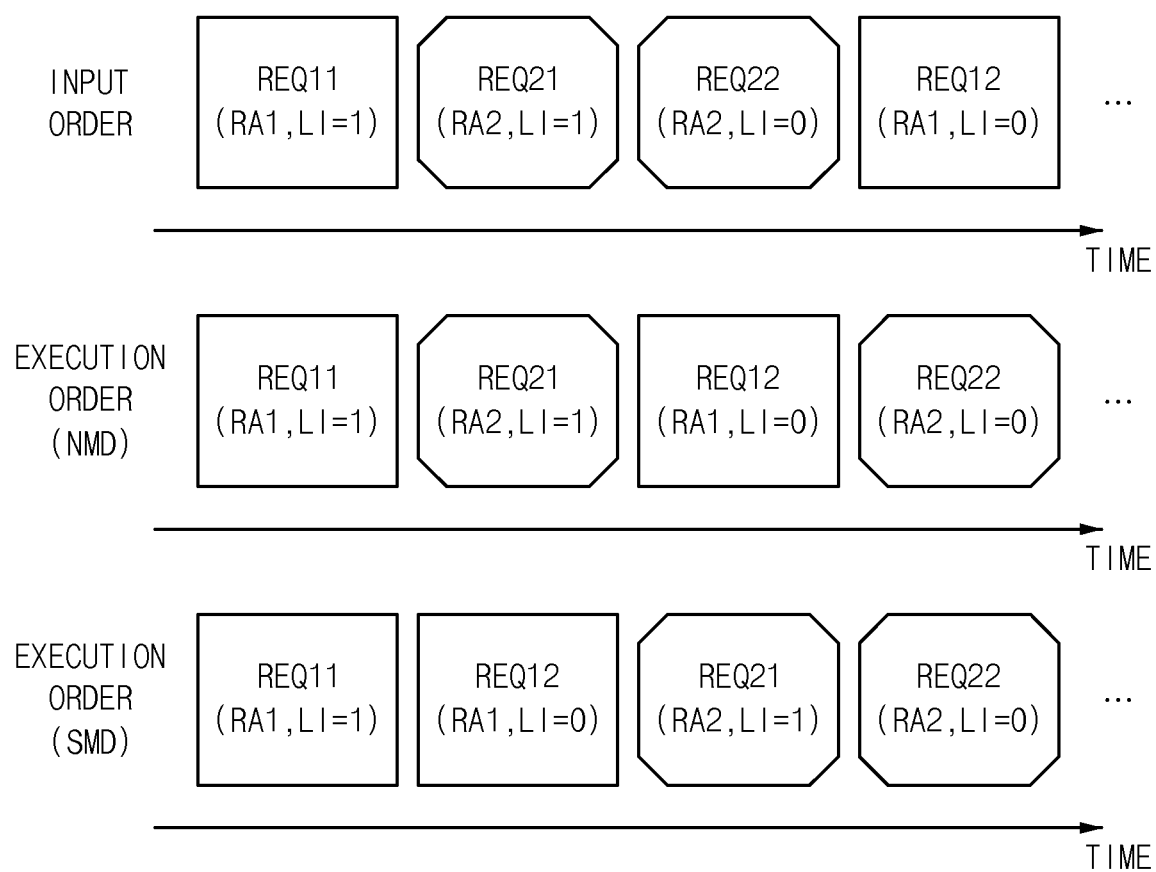
FIG. 8 is a diagram illustrating execution orders of requests in a normal mode and a sequential mode of a memory system according to an example embodiment.

FIG. 8 is a diagram illustrating execution orders of requests in a normal mode and a sequential mode of a memory system according to an example embodiment.

FIG. 8 illustrates an input order received by the memory controller 100 included in the electronic system 11 of FIG. 4 and an execution order determined by the request control circuit RCC in the normal mode NMD and an execution order determined by the request control circuit RCC in the sequential mode SMD. The descriptions repeated with that of FIG. 4 that relate to FIG. 8 are omitted for brevity.

Referring to FIGS. 4 and 8, for example, the request control circuit RCC of the memory controller 100 may sequentially receive the first request REQ11, the third request REQ21, the fourth request REQ22, and the second request REQ12.

The request control circuit RCC may determine the execution order of requests regardless of the locality information LI in the normal mode NMD. For example, the request control circuit RCC may select and output the requests received from the plurality of master devices 31 and 32 one by one according to the round robin scheme. In other words, as shown in FIG. 8, the request control circuit RCC may determine the execution order of requests in the order of the first request REQ11, the third request REQ21, the second request REQ12, and the fourth request REQ22.

On the other hand, in the sequential mode SMD, the request control circuit RCC determines the execution order or requests based on the locality information LI included in each request such that the requests that correspond to the same row address of the memory device 400 and are received from one master device are executed continuously. For example, two commands from a single master device may be executed one after the other without executing another command from another master device between the two commands. The request control circuit RCC may determine the execution order such that the requests received from the master devices other than the one master device may be performed after continuously executing the requests corresponding to the same row address. In other words, as shown in FIG. 8, the request control circuit RCC may determine the execution order of requests such that the requests may be executed in the order of the first request REQ11, the second request REQ12, the third request REQ21, and the fourth request REQ22. As such the first request REQ11 and the second request REQ12, which correspond to the same first row address RA1 of the memory device 400 and are received from the first master device 31, may be executed continuously based on the locality information LI. After continuously executing the first request REQ11 and the second request (REQ12), a request received from another master device, that is, the second master device 32 may be executed. Similarly, the third request REQ21 and the fourth request REQ22, which correspond to the same second row address RA2 of the memory device 400 and are received from the second master device 32 may be executed continuously based on the locality information LI.

Figure 9A:
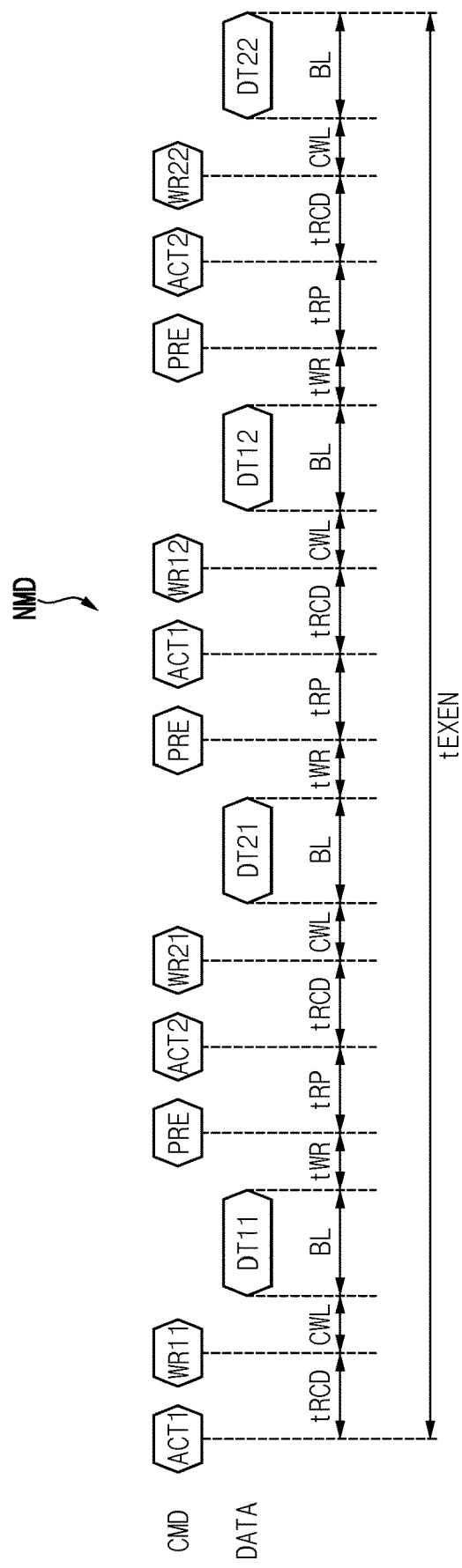
FIGS. 9A and 9B are timing diagrams illustrating operations of a memory system according to the execution orders of FIGS. 9A and 9B.
Figure 9B:
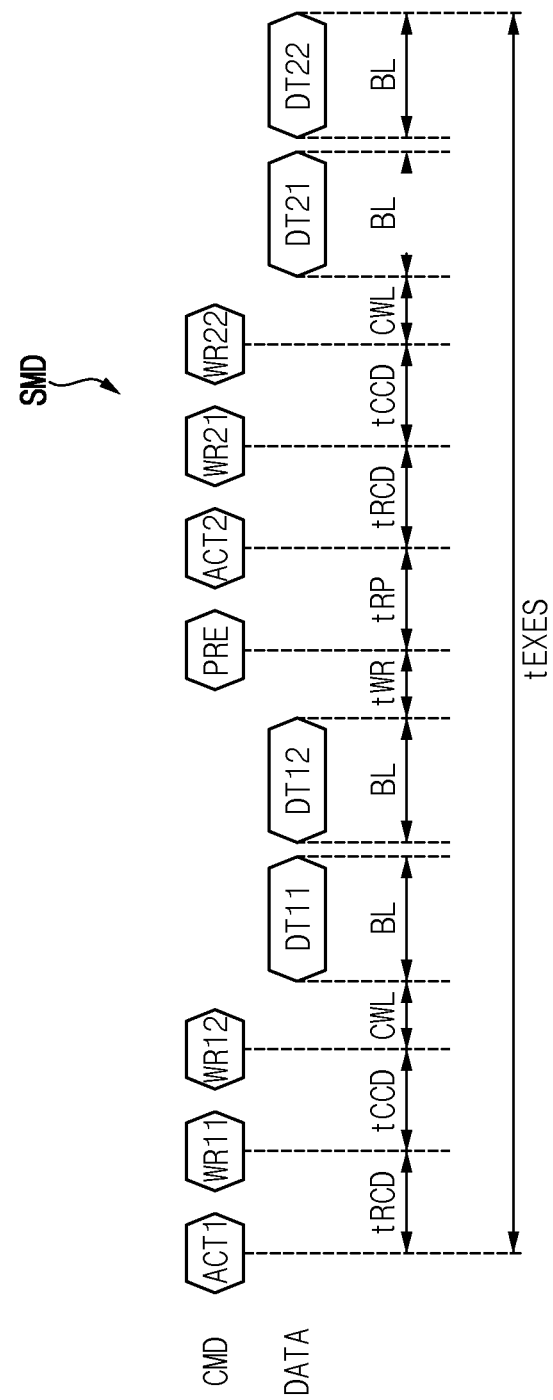

FIGS. 9A and 9B are timing diagrams illustrating operations of a memory system according to the execution orders of FIGS. 9A and 9B.

FIGS. 9A and 9B illustrate a case in which all of the first request REQ11, the second request REQ12, the third request REQ21, and the fourth request REQ22 are requests for performing write operations. The first request REQ11 is executed by transferring the first write command WR11 and the first write data DT11 to the memory device 400, and the second request REQ12 is executed by transferring the second write command WR12 and the second write data DT12 to the memory device 400. The third request REQ21 is executed by transferring the third write command WR21 and the third write data DT21 to the memory device 400, and the fourth request REQ22 is executed by transferring the fourth write command WR22 and the fourth write data DT22 to the memory device 400. In FIGS. 9A and 9B, tRCD, tCCD, CWL, tWR, and tRCD indicate the minimum time limits (e.g., the numbers of clocks) to be secured between commands CMD and data, and BL indicates the burst length of data transmission.

After the first wordline corresponding to the first row address RA1 is activated (opened) by the first activate command ACT1, another second wordline corresponding to the second row address RA2 may be activated (open) within the same memory bank. In this case, the memory bank must be inactivated or deactivated (closed) by the precharge command PRE and then the second wordline must be activated by the second activate command ACT2. In an embodiment, to activate the first wordline after the second wordline is activated by the second activate command ACT2, the memory bank is deactivated by the precharge command PRE, and then the first wordline is activated by the first activate command ACT1.

FIG. 9A illustrates commands and data according to the execution order corresponding to the normal mode NMD of FIG. 8, and FIG. 9B illustrates commands and data according to the execution order corresponding to the sequential mode SMD of FIG. 8.

As shown in FIG. 9A, in the case of the execution order corresponding to the normal mode NMD, write operations for different wordlines are interleaved, and the number of precharge commands PRE and activate commands ACT1 and ACT2 may increase. Time delay and power consumption according to the change of the activated wordlines may be referred to as "additional resources".

On the other hand, as shown in FIG. 9B, in the case of the execution order corresponding to the sequential mode SMD, the first request REQ11 and the second request REQ12 corresponding to the first row address RA1 are executed continuously, and then the third request REQ21 and the fourth request REQ22 corresponding to the second row address RA2 are executed continuously.

The memory controller 100 may transmit one activate command to the memory device 400 to continuously execute requests corresponding to the same row address in the sequential mode SMD. The memory device 400 may activate the selected wordline corresponding to the same row address based on the one activate command, and maintain the activate state of the selected wordline while continuously executing requests corresponding to the same row address. For example, as shown in FIG. 9B, the memory controller 100 may transfer the one activate command ACT1 to execute the first request REQ11 and the second request REQ12 corresponding the same first row address RA1 of the memory device 400 based on the one activate command ACT1. Since the precharge command PRE is not transmitted from the memory controller 100 while the first request REQ11 and the second request REQ12 are executed continuously, the memory device 400 may maintain the activated state of the selected wordline corresponding to the first row address RA1.

As a result, as shown in FIGS. 9A and 9B, the execution time tEXES in the sequential mode SMD may be decreased in comparison with the execution time tEXEN in the normal mode NMD.

Figure 10A:
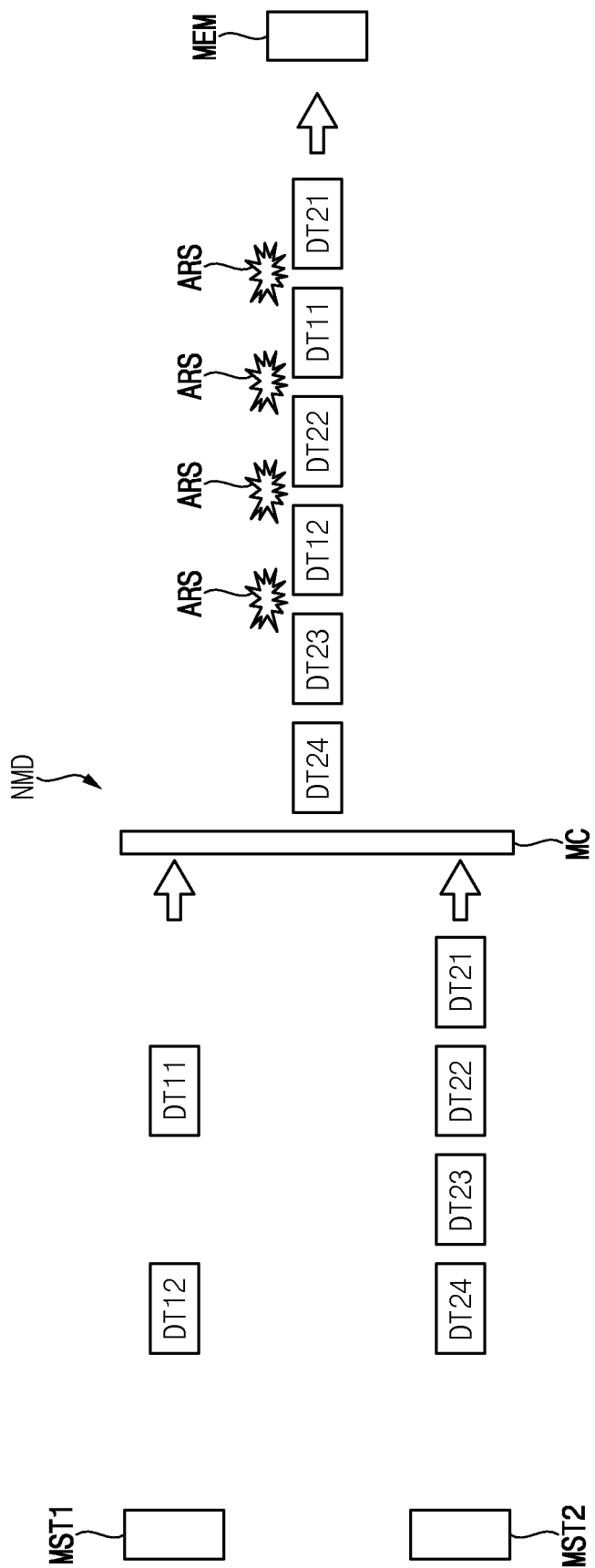
FIGS. 10A and 10B are diagrams illustrating generation of additional resources in a normal mode and a sequential mode of an electronic system according to example embodiments.
Figure 10B:
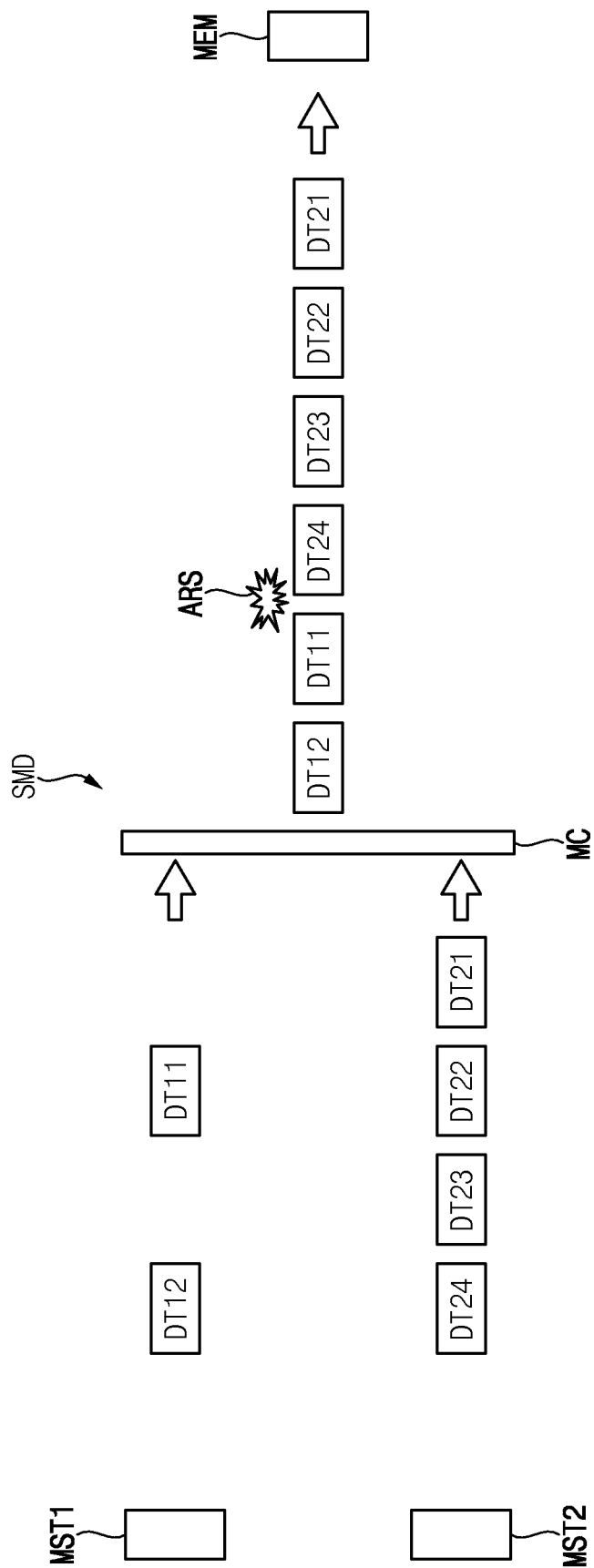

FIGS. 10A and 10B are diagrams illustrating generation of additional resources in a normal mode and a sequential mode of an electronic system according to example embodiments.

FIG. 10A illustrates the case of the normal mode NMD, and FIG. 10B illustrates the case of the sequential mode SMD.

Referring to FIGS. 10A and 10B, the first master device MST1 transfers write data DT11 and DT12 corresponding to the same row address (e.g., the first row address RA1) to the memory controller MC, and the second master device MST2 transmits the write data DT21, DT22, DT23, and DT24 corresponding to the same row address (e.g., the second row address RA2) to the memory controller MC. The data may be sequentially transferred to the memory device MEM according to the execution order corresponding to the normal mode NMD or the sequential mode SMD, respectively.

As shown in FIG. 10A, in the case of the execution order corresponding to the normal mode NMD, the additional resources ARS may occur frequently according to the frequent change of the selected wordline. On the other hand, in the case of the execution order corresponding to the sequential mode SMD as shown in FIG. 10B, the occurrence frequency of the additional resources ARS may be significantly reduced by the continuous or successive execution of the requests corresponding to the same row.

Figure 11:
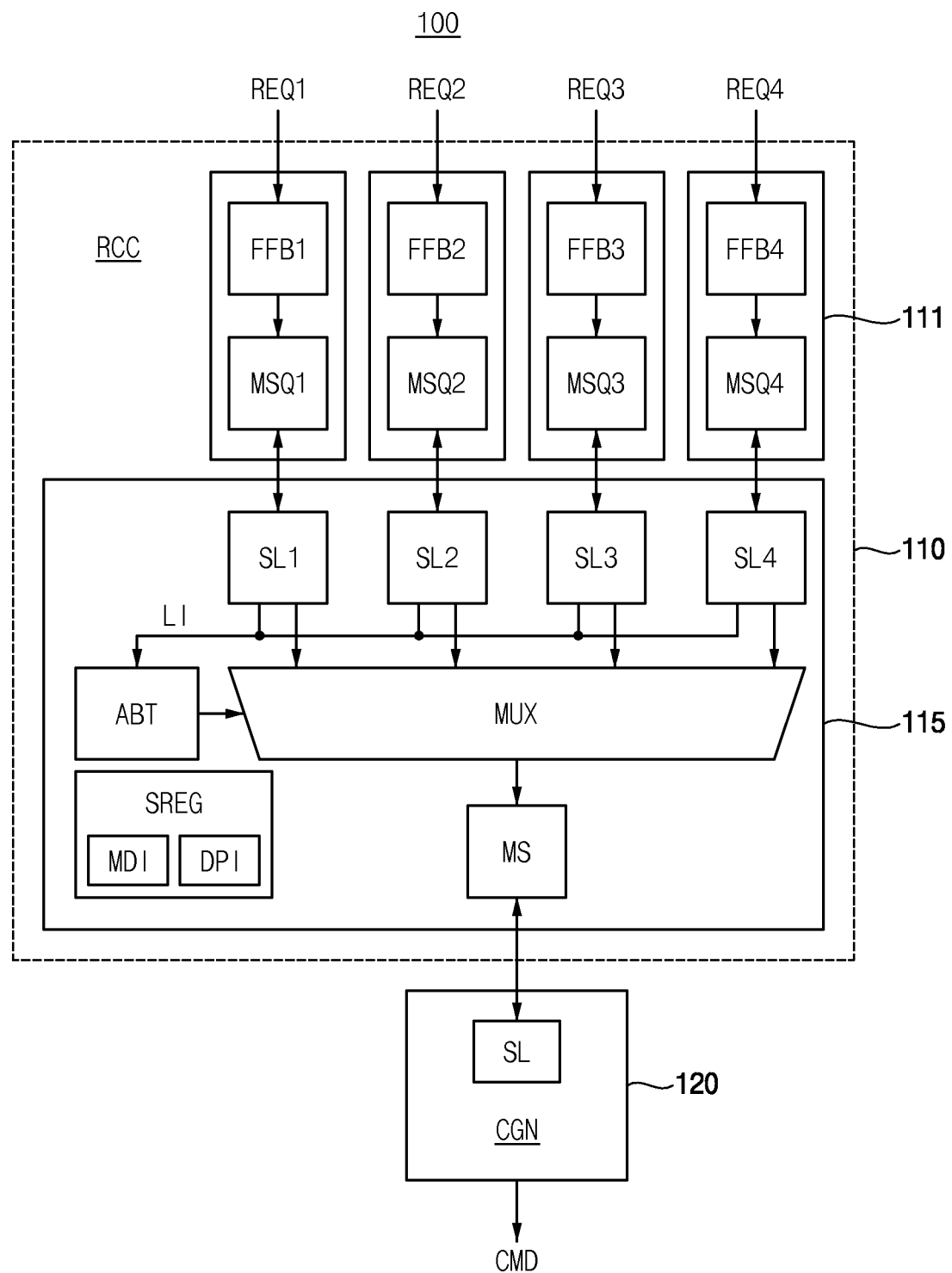
FIG. 11 is a diagram illustrating a memory controller according to an example embodiment.

FIG. 11 is a diagram illustrating a memory controller according to an example embodiment.

Referring to FIG. 11, the memory controller 100 may include the request control circuit RCC 110 and the command generator CGN 120.

The request control circuit RCC may include a plurality of request queue circuits 111 and a request arbitration circuit 115. The plurality of request queue circuits 111 may include a plurality of request queues FFB1, FFB2, FFB3 and FFB4 and a plurality of master interface circuits MSQ1, MSQ2, MSQ3 and MSQ3.

The plurality of request queues FFB1, FFB2, FFB3 and FFB4 may store requests REQ1, REQ2, REQ3 and REQ4 received from the plurality of master devices (e.g., the master devices 31, 32, 33 and 34 of FIG. 1) such that each request queue sequentially stores requests received from each master device. In some example embodiments, the plurality of request queues FFB1, FFB2, FFB3 and FFB4 may be implemented as First-In First-Out (FIFO) buffers. Each of the requests REQ1, REQ2, REQ3 and REQ4 may include locality information LI as described above.

The request arbitration circuit 115 may receive one of the requests output from the plurality of request queues FFB1, FFB2, FFB3 and FFB4 and sequentially output the requests that are received by the request arbitration circuit 115, based on the locality information LI included in each request in the sequential mode SMD.

In some example embodiments, the request arbitration circuit 115 include a plurality of slave interface circuits SL1, SL2, SL3 and SL4, a multiplexer MUX, an arbitrator ABT (e.g., a circuit), a status register SREG and a master interface circuit MS. Each master interface circuit MSQi (i=1, 2, 3, 4) included in each request queue circuit 111 and each slave interface circuit SLi included in the request arbitration circuit 115 may transfer the requests according to a handshake scheme as will be described below with reference to FIGS. 12A, 12B and 12C.

The multiplexer MUX may select and sequentially output one of the requests output from the plurality of slave interface circuits SL1, SL2, SL3 and SL4 under the control of the arbitrator ABT.

The arbitrator ABT may control the operation of the multiplexer MUX. In the sequential mode SMD, the arbitrator ABT may control the multiplexer MUX such that the multiplexer MUX may receive one of the requests output from the plurality of request queues FFB1, FFB2, FFB3 and FFB4 and sequentially output the received requests one by one based on the locality information LI included in each request. Meanwhile, in the normal mode NMD in which the execution order of requests is determined regardless of the locality information LI, the multiplexer MUX may receive and output requests output from the plurality of request queues 111 one by one according to a round robin scheme or a least recently used (LRU) scheme, under the control of the arbitrator ABT.

In the sequential mode SMD, the request arbitration circuit 115 may, based on the locality information LI, continuously receive and output requests output from one request queue among the plurality of request queues FFB1, FFB2, FFB3 and FFB4 and stop receiving requests output from other request queues while the request arbitration circuit continuously receives and outputs the requests output from the one request queue. In addition, the request arbitration circuit 115 may, after continuously receiving and outputting the requests output from the one request queue, receive and output requests output from other request queues according to the round robin scheme.

The status register SREG may store information for controlling the operation of the request arbitration circuit 115, such as mode information MDI and depth information DPI. The mode information MDI may indicate whether the present operation mode is the normal mode NMD or the sequential mode SMD. The depth information DPI may indicate the maximum number of requests that are executed continuously. The request arbitration circuit 115 may continuously receive and output requests equal to or less than the maximum number output from the one request queue based on the depth information DPI. In other words, the request arbitration circuit 115 may limit the number of the requests that are received from the one master device and executed continuously to be smaller than or equal to the maximum number of the depth information DPI. An execution order of requests according to the depth information DPI will be described below with reference to FIG. 14.

The master interface circuit MS of the request arbitration circuit 115 may transmit requests sequentially output from the multiplexer MUX to the slave interface circuit SL of the command generator 120.

The command generator 120 may sequentially generate commands CMD for memory access operations based on requests received from the request arbitration circuit 115 through the slave interface circuit SL.

Figure 12A:
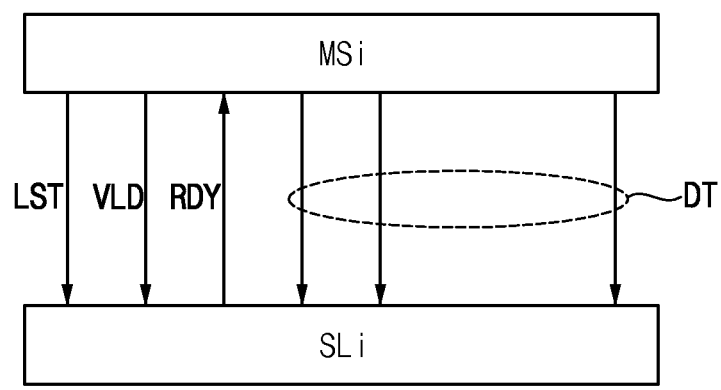
Figure 12C:
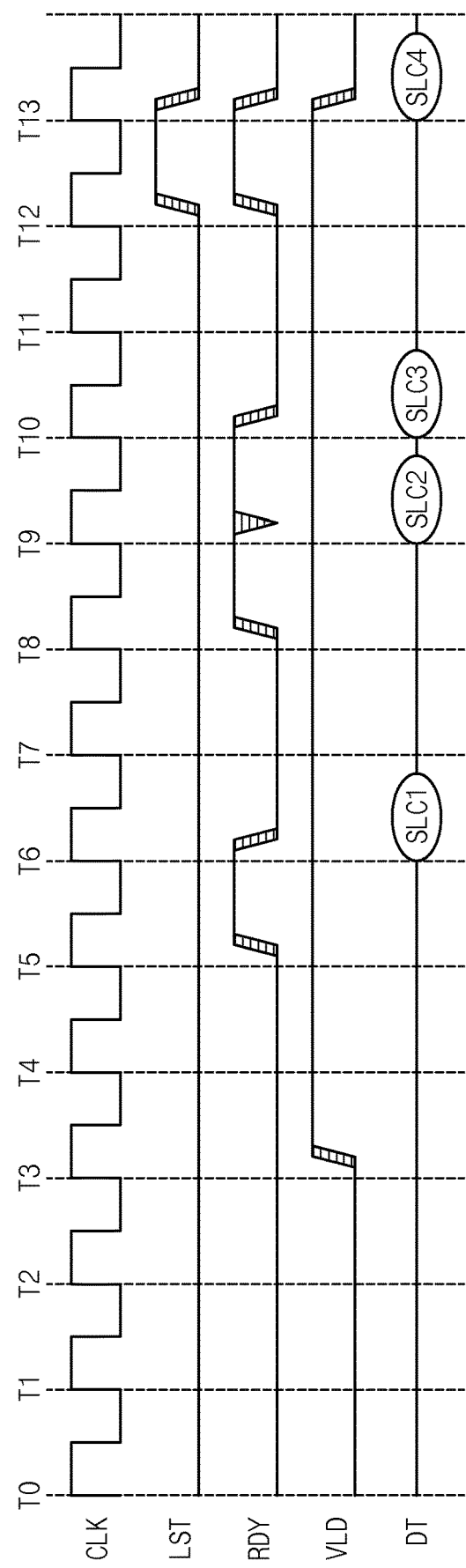

FIGS. 12A, 12B and 12C are diagrams illustrating an example embodiment of transaction performed by a memory controller according to example embodiments.

FIG. 12A illustrates one master interface circuit MSi and one corresponding slave interface circuit SLi. The master interface circuit MSi and the slave interface circuit SLi may include signal ports to communicate a ready signal RDY, a valid signal VLD, a last signal LST and data signals DT.

FIG. 12B illustrates the ports respectively corresponding to the ready, valid, last and data signals RDY, VLD, DT and LST, the bit size of the ports, the input/output (I/O) type of the ports, and the related description. FIG. 12B illustrates an example that the bit size of the data signal DT is 64, but example embodiments of the inventive concept are not limited thereto.

FIG. 12C illustrates an example of a transaction according to an advanced extensible interface (AXI) protocol performed by a system according to an example embodiment. The AXI protocol adopts a handshake scheme using the valid signal VLD and the ready signal RDY. In FIG. 12C, time points T1~T13 indicate rising edges of a clock signal CLK.

Referring to FIGS. 12A, 12B and 12C, according to the handshake scheme, if the master interface circuit MSi is ready to transfer a signal to the slave interface circuit SL, the master interface circuit MSi may activate the valid signal VLD (e.g., after time point T3), and if the slave interface circuit SLi is ready to receive the data signals DT, in other words, to receive each slice of the packet, the slave interface circuit SLi may activate the ready signal RDY (e.g., after time point T5). For example, the master interface circuit MSi may output an activated valid signal VLD to the slave interface circuit SLi to inform the slave interface circuit SLi it is ready to transfer a signal to the slave interface circuit SLi, the slave interface circuit SLi may output an activated ready signal RDY in response to the receipt of the activated valid signal VLD to inform the master interface circuit MSi that it is ready to receive a signal, and then the master interface circuit MSi may transfer the signal to the slave interface circuit SLi in response to receipt of the activated ready signal RDY. The master interface circuit MSi may activate the last signal LST when the master interface circuit MSi is ready to transfer the last slice of the packet.

Sampling of signals may be performed in response to the rising edges of the clock signals CLK at both of the master interface circuit MS and the slave interface circuit SL. Accordingly, as illustrated in FIG. 12C, slices SLC1, SLC2, SLC3 and SLC4 may be transferred at the time points T6, T9, T10 and T13 from the master interface circuit MSi to the slave interface circuit SLi.

Figure 13:
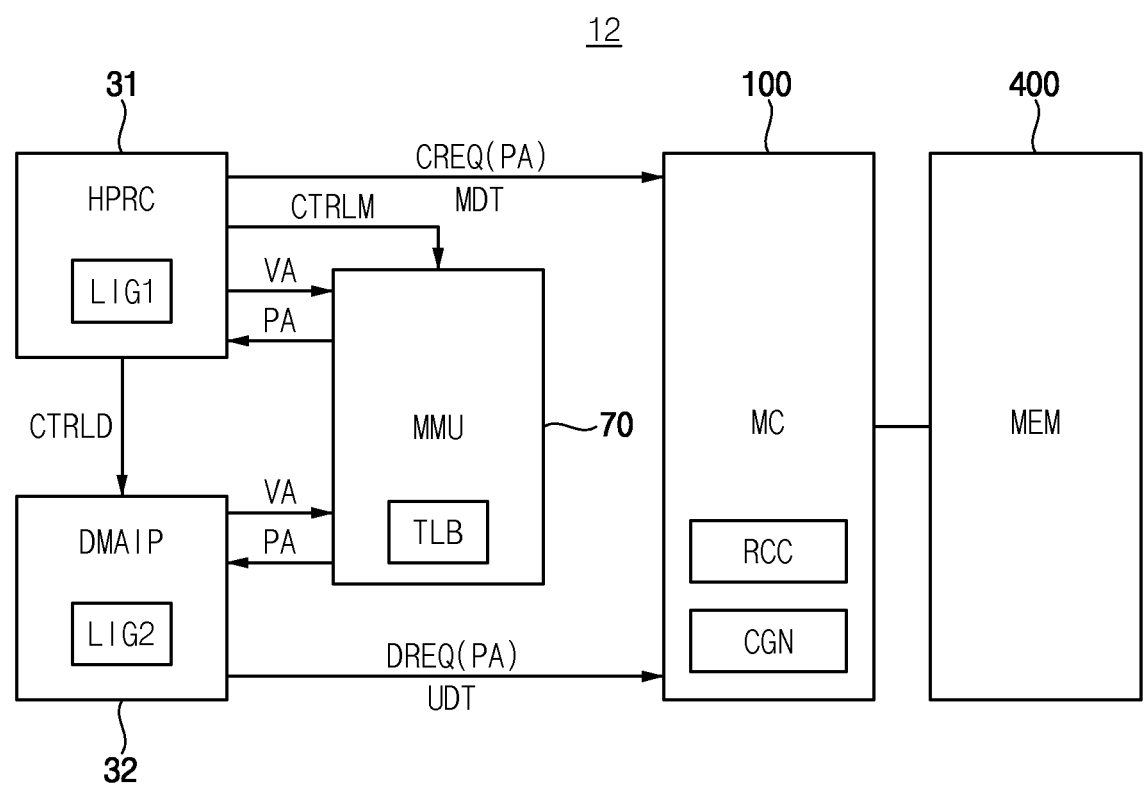
FIG. 13 is a block diagram illustrating an electronic system according to an example embodiment.

FIG. 13 is a block diagram illustrating an electronic system according to an example embodiment.

Referring to FIG. 13, an electronic system 12 includes a host processor HPRC 31 corresponding to the first master device 31, a direct memory access device DMAIP 32 corresponding to the second master device 32, and a memory management unit MMU 70 (e.g., a memory management circuit), a memory controller 100, and a memory device MEM 400. The direct memory access device 32 may be controlled by a control signal CTRLD provided from the host processor 31, and the memory management unit 70 may be controlled by a control signal CTRLM provided from the host processor 31.

The memory device 400 may store user data, metadata, and program codes. Software programs such as an operating system and applications may be loaded into the memory device 400 and the memory device 400 may function as a working memory of the electronic system 12.

The memory device 400 may be implemented as a volatile memory such as dynamic random access memory (DRAM) or static random access memory (SRAM), but example embodiments of the inventive concept are not limited thereto. The memory device 400 may be implemented as other types of volatile or nonvolatile memory devices.

The direct memory access device 32 has a direct memory access function for the memory device 400. For example, the direct memory access device 400 may be a camera, a graphics processing unit (GPU), a neural processing unit (NPU), a peripheral component interconnect express (PCIe) device, or a universal flash storage (UFS) device. FIG. 13 illustrates one direct memory access device, but example embodiments of the inventive concept are not limited thereto. The electronic system 12 may include a plurality of intellectual properties (IPs) having various functions, and two or more IPs may have the direct memory access function.

Direct memory access is a method of directly transferring data to and from the memory device 400 without intervention of the host processor 31 such as a central processing unit (CPU), and may be supported by a transfer bus inside the electronic system 12.

Direct memory access methods include a burst mode, which takes control from the CPU and transfers data at once, and a cycle stealing mode, which performs direct memory access when the CPU is not accessing memory. Since direct memory access does not require CPU intervention during data transfer, system performance can be increased because the CPU can perform other tasks.

The memory management unit 70 may manage core access of the host processor 31 to the memory device 400 and direct access of the direct memory access device 32 to the memory device 400. The core access and the direct access may include a read operation for reading data from the memory device 400 and a write operation for storing data to the host memory device 400.

The core access is performed based on a core access request CREQ issued from the host processor 31, and the direct access is performed based on a direct access request DREQ issued from the direct memory access device 32. For example, in the case of a write operation, the metadata MDT may be transmitted from the host processor 31 to the memory controller 100 along with the core access request CREQ, and the user data UDT may be transmitted from the direct memory access device 32 to the memory controller 100 along with the direct access request DREQ.

The core access request CREQ and the direct access request DREQ may each include a physical address PA for a data write operation or a data read operation. The memory management unit 70 may provide the physical address PA mapped to a virtual address VA by performing address translation. The virtual address VA represents a location in the virtual address space of the operating system and the physical address PA represents the actual physical location of the memory area of the memory device 400.

The memory management unit 70 may include a translation look-aside buffer TLB that stores recently referenced address mapping information and/or frequently referenced address mapping information.

According to an example embodiment, the host processor 31 and the direct memory access device 32 each include the aforementioned locality information generators LIG1 and LIG2, and the memory controller 100 may include a request control circuit RCC and a command generator CGN as described above.

Figure 14:
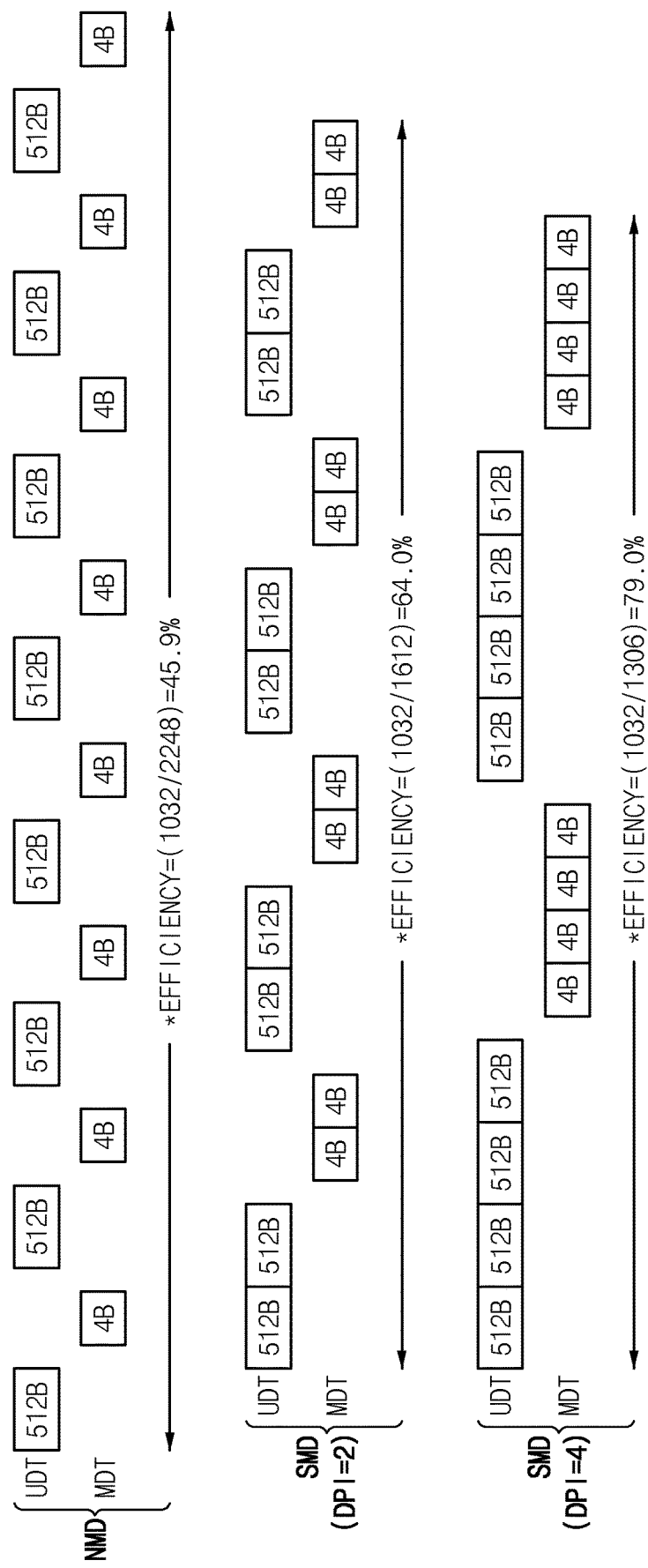
FIG. 14 is a diagram illustrating efficiency of a memory device included in the electronic system of FIG. 13.

FIG. 14 is a diagram illustrating efficiency of a memory device included in the electronic system of FIG. 13.

FIG. 14 illustrates an example transfer of data UDT, with respect to the normal mode NMD, and the sequential mode SMD when the depth information DPI is two and four. The depth information DPI may indicate the maximum number of requests received from one master device and continuously executed. For example, 512 B (byte) of user data UDT may be transferred through one core access request CREQ, and 4 B of metadata MDT may be transferred through one direct access request DREQ.

In a DRAM, when the memory access operation corresponding to another row address is performed after a memory access operation corresponding to a specific row address, additional resources ARS described with reference to FIGS. 9A to 10B may be used.

When consecutive data corresponding to the same row address is transferred, such as a sequential write, a maximum efficiency can be achieved in terms of data throughput, but the transfer of metadata MDT may be needed during the transmission of user data UDT. When another command is executed, additional resources are consumed. Accordingly, since the interleaving of the metadata MDT occurs more frequently, the efficiency becomes lower.

Throughput of the DRAM may be determined by a product of maximum bandwidth and efficiency. Efficiency may be determined by the ratio of data transfer time to total operation time. As shown in FIG. 14, compared to the normal mode NMD, the efficiency is increased in the case of the sequential mode SMD. In addition, the efficiency is increased as the depth information DPI, that is, the maximum number of requests received from one master device and executed continuously is increased.

Figure 15A:
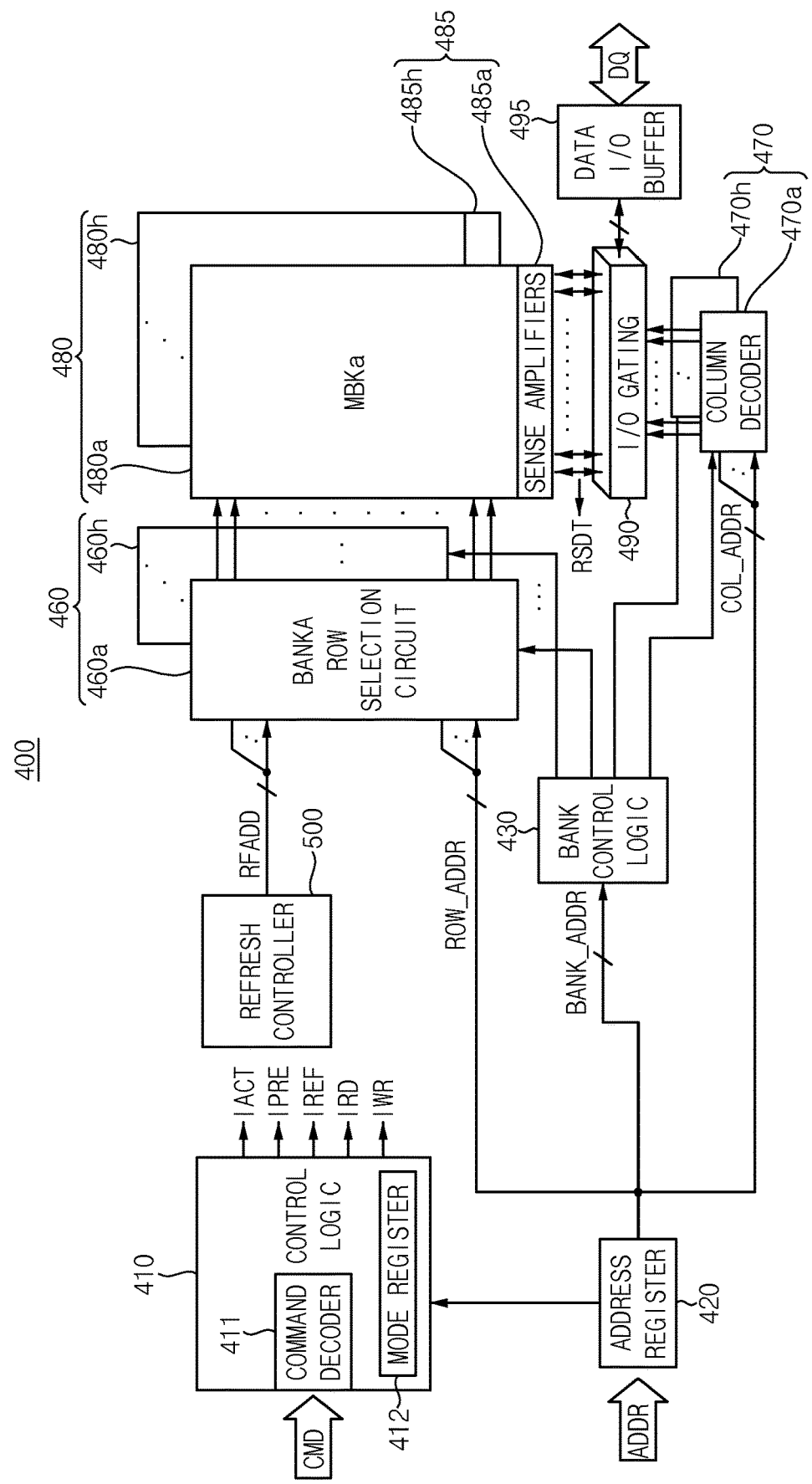
FIG. 15A is a block diagram illustrating a semiconductor memory device according to an example embodiment.

FIG. 15A is a block diagram illustrating a semiconductor memory device according to an example embodiment.

Referring to FIG. 15A, a semiconductor memory device 400 may include a command control logic 410, an address register 420, a bank control logic 430, a row selection circuit 460 (or row decoder), a column decoder 470, a memory cell array 480, a sense amplifier unit 485, an input/output (I/O) gating circuit 490, a data input/output (I/O) buffer 495, and a refresh controller 500 (e.g., a control circuit).

The memory cell array 480 may include a plurality of bank arrays 480a, . . . , 480h. The row selection circuit 460 may include a plurality of bank row selection circuits 460a, . . . , 460h respectively coupled to the bank arrays 480a, . . . , 480h. The column decoder 470 may include a plurality of bank column decoders 470a, . . . , 470h respectively coupled to the bank arrays 480a, . . . , 480h. The sense amplifier unit 485 may include a plurality of bank sense amplifiers 485a, . . . , 485h respectively coupled to the bank arrays 480a, . . . , 480h.

The address register 420 may receive an address ADDR including a bank address BANK_ADDR, a row address ROW_ADDR, and a column address COL_ADDR from the memory controller 200. The address register 420 may provide the received bank address BANK_ADDR to the bank control logic 430, may provide the received row address ROW_ADDR to the row selection circuit 460, and may provide the received column address COL_ADDR to the column decoder 470.

The bank control logic 430 may generate bank control signals in response to the bank address BANK_ADDR. One of the bank row selection circuits 460a, . . . , 460h corresponding to the bank address BANK_ADDR may be activated in response to the bank control signals, and one of the bank column decoders 470a, . . . , 470h corresponding to the bank address BANK_ADDR may be activated in response to the bank control signals.

The row address ROW_ADDR from the address register 420 may be applied to the bank row selection circuits 460a, . . . , 460h. The activated one of the bank row selection circuits 460a, . . . , 460h may decode the row address ROW_ADDR, and may activate a wordline corresponding to the row address ROW_ADDR. For example, the activated bank row selection circuit 460 may apply a wordline driving voltage to the wordline corresponding to the row address ROW_ADDR.

The column decoder 470 may include a column address latch. The column address latch may receive the column address COL_ADDR from the address register 420, and may temporarily store the received column address COL_ADDR. In some example embodiments, in a burst mode, the column address latch may generate column addresses that increment from the received column address COL_ADDR. The column address latch may apply the temporarily stored or generated column address to the bank column decoders 470a, . . . , 470h.

The activated one of the bank column decoders 470a, . . . , 470h may decode the column address COL_ADDR, and may control the I/O gating circuit 490 to output data corresponding to the column address COL_ADDR.

The I/O gating circuit 490 may include circuitry for gating input/output data. The I/O gating circuit 490 may further include read data latches for storing data that is output from the bank arrays 480a, . . . , 480h, and write drivers for writing data to the bank arrays 480a, . . . , 480h.

Data to be read from one bank array of the bank arrays 480a, . . . , 480h may be sensed by one of the bank sense amplifiers 485a, . . . , 485h coupled to the one bank array from which the data is to be read, and may be stored in the read data latches. The data stored in the read data latches may be provided to the memory controller 200 via the data I/O buffer 495. Data DQ to be written in one bank array of the bank arrays 480a, . . . , 480h may be provided to the data I/O buffer 495 from the memory controller 200. The write driver may write the data DQ in one bank array of the bank arrays 480a, . . . , 480h.

The command control logic 410 may control operations of the memory device 400. For example, the command control logic 410 may generate control signals for the memory device 400 to perform a write operation, a read operation, or a refresh operation. The command control logic 410 may generate internal command signals, such as an active signal IACT, a precharge signal IPRE, a refresh signal IREF, a read signal IRD, a write signal IWR, etc., based on commands CMD transferred from the memory controller. The command control logic 410 may include a command decoder 411 that decodes the commands CMD received from the memory controller 200 and a mode register set 412 that sets an operation mode of the memory device 400.

The refresh controller 500 may control the refresh operation with respect to the memory cells included in the memory cell array 480, and generate a refresh address RFADD indicating the location where the refresh operation is performed in the memory cell array 480.

Although the command control logic 410 and the address register 420 are shown as separate components in FIG. 15A, the command control logic 410 and the address register 420 may be implemented as one indivisible component. In addition, although the command CMD and the address ADDR are shown as being provided as separate signals in FIG. 15A, the address may be regarded as being included in the command as presented in the DDR4, DDR5, HBM, LPDDR5 standards, etc.

Figure 15B:
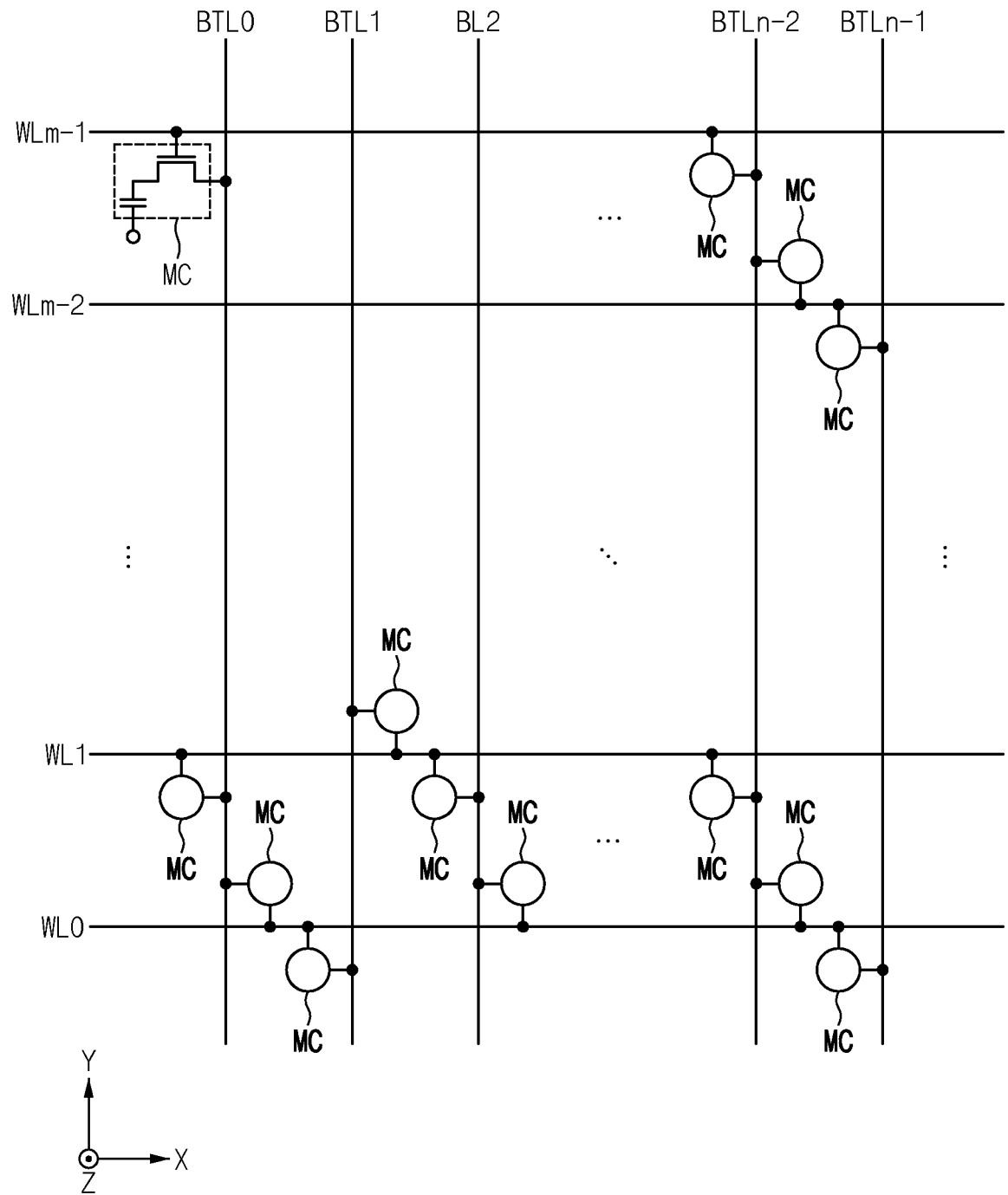
FIG. 15B is a diagram illustrating a bank array included in the memory device of FIG. 15A.

FIG. 15B is a diagram illustrating a bank array included in the memory device of FIG. 15A. The first bank arrays 480a may be representative of the first through eighth bank arrays 480a to 480h in FIG. 15A.

Referring to FIG. 15B, the first bank array 480a may include a plurality of wordlines WL0~WLm-1, where m is an even integer equal to or greater than two, a plurality of bitlines BTL0~BTLn-1, where n is an even integer equal to or greater than two, and a plurality of memory cells MC disposed at intersections between the wordlines WL0~WLm-1 and the bitlines BTL0~BTLn-1.

In some example embodiments, each of the memory cells MC may include a DRAM cell. The arrangement of the plurality of memory cells MC may differ based on whether a memory cell MC is coupled to an even wordline (for example, wordline WL0) or to an odd wordline (for example, wordline WL1). For example, a bitline coupled to adjacent memory cells MC may be selected based on whether a wordline selected by an access address is an even wordline or an odd wordline.

Figure 16:
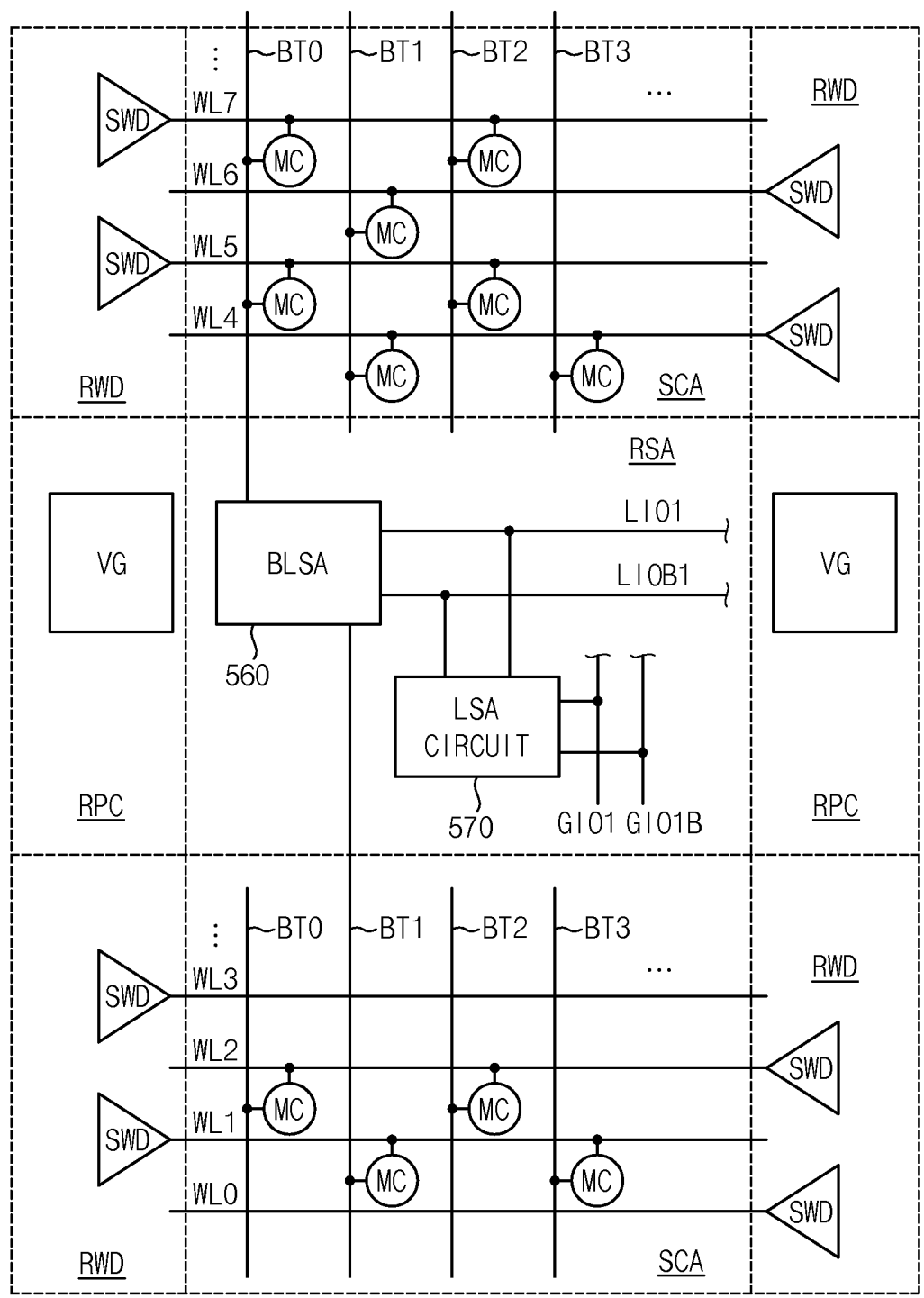
FIG. 16 is a diagram illustrating a schematic configuration of a memory device included in a memory system according to an example embodiment.

FIG. 16 is a diagram illustrating a schematic configuration of a memory device included in a memory system according to an example embodiment.

Referring to FIG. 16, the sub cell arrays SCA, the sense amplifier regions RSA, the wordline driver regions RWD and the power and control regions RPC may be disposed in the memory core circuit. The above-described decoder regions RRD are omitted in FIG. 16. As shown, the sub cell arrays SCA may include a plurality of wordlines WL0~WL7 extending in the row direction, a plurality of bitlines BTL0~BTL3 extending in the column direction, and the memory cells MC disposed at the intersections of the wordlines WL0~WL3 and the bitlines BTL0~BTL3. The wordline driver regions RWD may include a plurality of sub wordline drivers SWD that may respectively drive the wordlines WL0~WL3. The sense amplifier regions RSA may include bitline sense amplifiers BLSA coupled to the bitlines BTL0~BTL3 with the open bitline structure in, and a local sense amplifier (LSA) circuit 570. The bitline sense amplifier BLSA may sense and amplify a voltage difference between the bitlines BTL0~BTL3 to provide the amplified voltage difference to a local I/O line pair LIO1 and LIOB1. The power circuit to supply power to each sub peripheral circuit and the control circuit to control the operation of each sub peripheral circuit may be disposed in the power and control region RPC. FIG. 16 illustrates voltage drivers VG disposed in the power and control region RPC, but example embodiments are not limited thereto.

Figure 17:
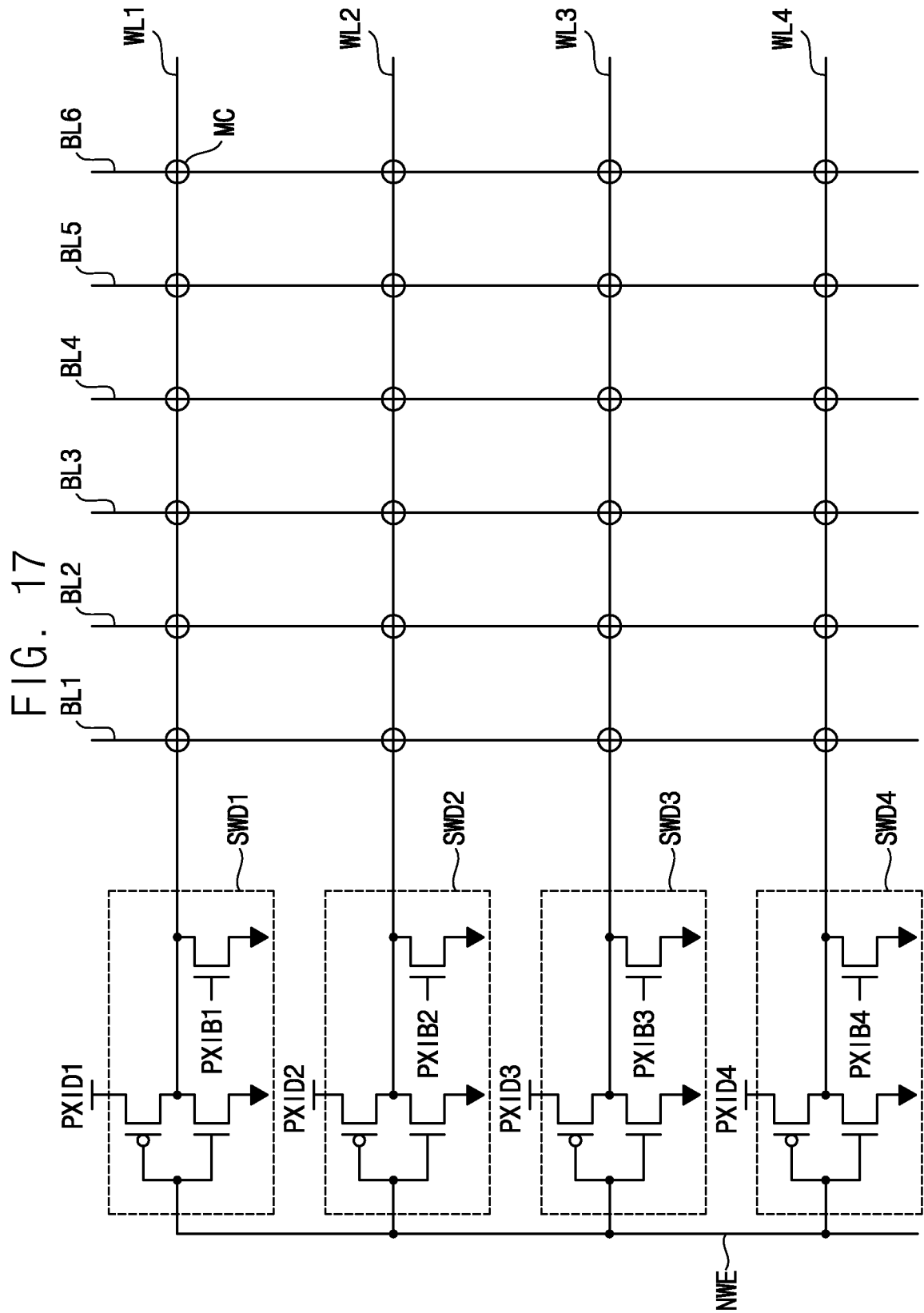
FIG. 17 is a diagram illustrating an example embodiment of a sub wordline driver included in the memory device of FIG. 16.

FIG. 17 is a diagram illustrating an example embodiment of a sub wordline driver included in the memory device of FIG. 16.

FIG. 17 illustrates an example that a plurality of wordlines WL1~WL4 are connected to one main wordline NWE through sub wordline drivers SWD1~SWD4. Signals PXID1~PXID4 and PXIB1~PXIB4 are generated by address decoding. The signals PXID1~PXID4 may be generated by the row decoding circuit included in the above-described decoder region RRD. The row decoding circuit generates the signals PXID1~PXID4 by decoding at least a portion of the row address.

When an access operation to another row is performed following an access operation to one row (wordline), additional resources as described above may occur due to address decoding, inactivation of the one row and activation of the other row, etc. According to example embodiments, by efficiently determining the execution order of requests based on the locality information, the additional resources of the memory device may be reduced and efficiency of the memory device may be increased, thereby increasing the performance of the memory device and an electronic system including the memory device.

Figure 18:
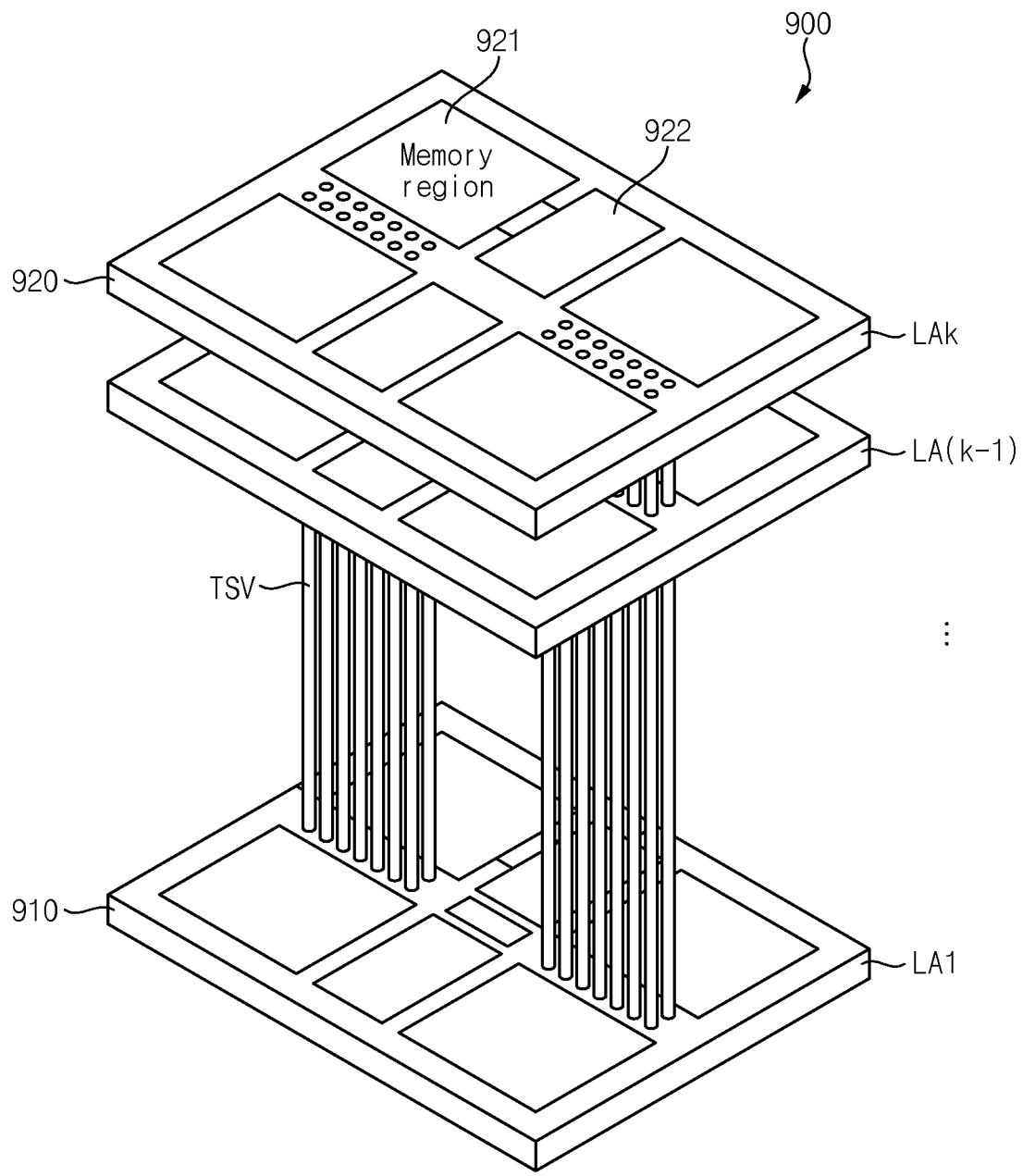
FIG. 18 is a diagram illustrating a stacked memory device included in a memory system according to example an embodiment.

FIG. 18 is a diagram illustrating a stacked memory device included in a memory system according to an example embodiment.

Referring to FIG. 18, a semiconductor memory device 900 may include first through kth semiconductor integrated circuit layers LA1 910 through LAk 920, in which the lowest, first semiconductor integrated circuit layer LA1 is assumed to be an interface or control chip, and the other semiconductor integrated circuit layers LA2 through LAk are assumed to be slave chips including core memory chips. The slave chips may form a plurality of memory ranks as described above. For example, the slave chips may correspond to the slave circuits 41-43.

The first through kth semiconductor integrated circuit layers LA1 through LAk may transmit and receive signals between the layers by through-substrate vias TSVs (e.g., through-silicon vias). The lowest first semiconductor integrated circuit layer LA1, as the interface or control chip, may communicate with an external memory controller through a conductive structure formed on an external surface.

Each of the first semiconductor integrated circuit layer LA1 910 through the kth semiconductor integrated circuit layer LAk 920 may include memory regions 921 and peripheral circuits 922 for driving the memory regions 921. For example, the peripheral circuits 922 may include a row-driver for driving wordlines of a memory, a column-driver for driving bitlines of the memory, a data input-output circuit for controlling input-output of data, a command buffer for receiving a command from an outside source and buffering the command, and an address buffer for receiving an address from an outside source and buffering the address.

The first semiconductor integrated circuit layer LA1 910 may further include a control circuit. The control circuit may control access to the memory region 921 based on a command and an address signal from a memory controller and may generate control signals for accessing the memory region 921.

According to example embodiments, the stacked memory device 900 may be a high bandwidth memory (HBM) in which the semiconductor layers LA1 to LAk include a plurality of DRAM semiconductor dies.

Figure 19:
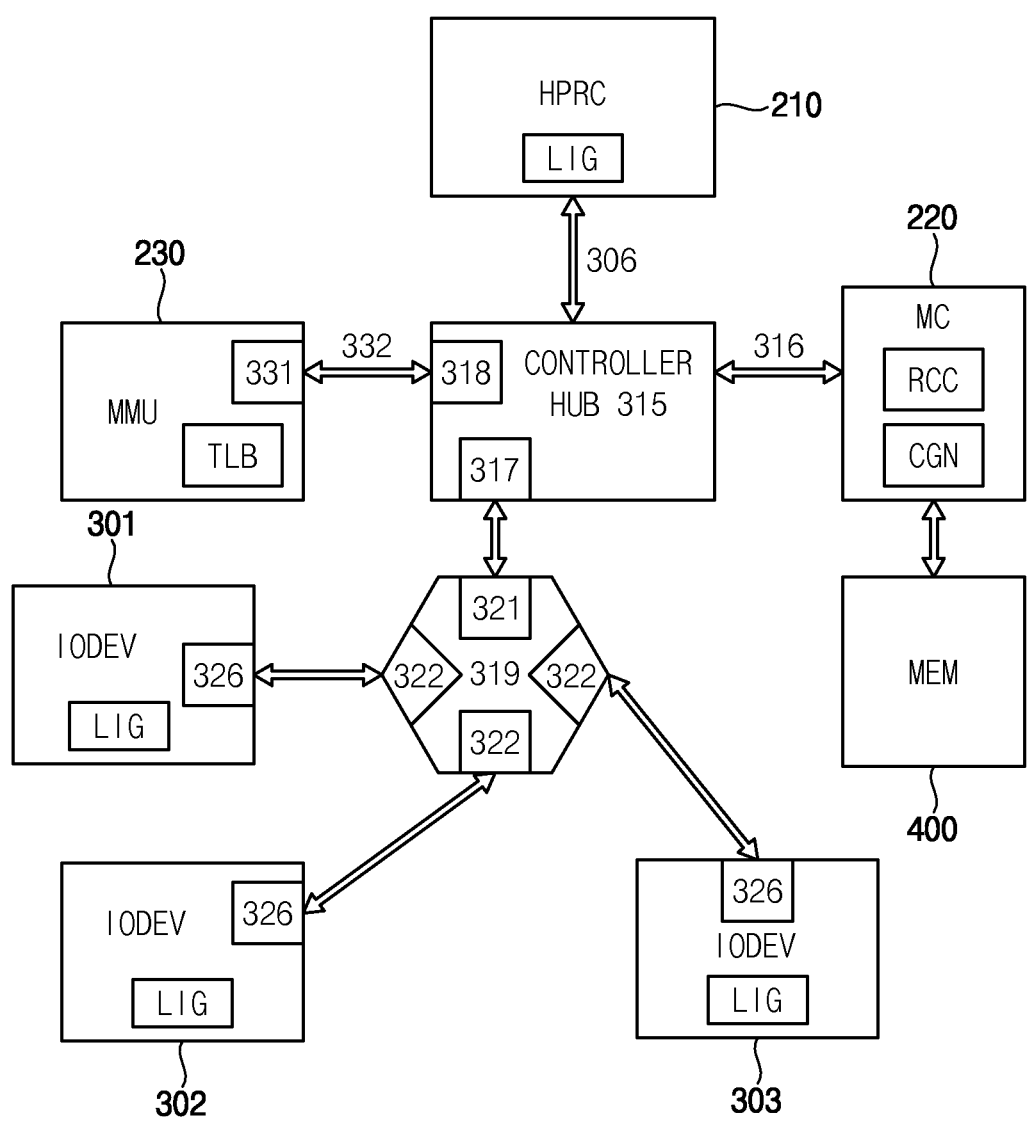
FIG. 19 is a block diagram illustrating an example embodiment of an interconnect architecture of an electronic system according to an example embodiment.

FIG. 19 is a block diagram illustrating an example embodiment of an interconnect architecture of an electronic system according to an example embodiment. For example, the interconnect device 80 may be implemented by the interconnect architecture.

Referring to FIG. 19, an example embodiment of a design composed of point-to-point links that interconnect a set of components is illustrated. An electronic system 15 includes a host processor HPRC 210, a memory controller MC 220 and a memory management unit MMU 230 coupled to a controller hub 315. The memory controller 220 may be coupled to a memory device MEM 400 through a memory interface. Examples of the memory interface include a double-data rate (DDR) memory interface, a dual-channel DDR memory interface, and a dynamic RAM (DRAM) memory interface.

The host processor 210 includes any processing element, such as a microprocessor, a host processor, an embedded processor, a co-processor, or other processor. The host processor 210 is coupled to the controller hub 315 through a front-side bus (FSB) 306. In one example embodiment, the FSB 306 is a serial point-to-point interconnect. In another example embodiment, the FSB 306 includes a serial, differential interconnect architecture that is compliant with a different interconnect standard.

The memory device 400 includes any memory device, such as random access memory (RAM), non-volatile (NV) memory, solid state memory, or other memory accessible by devices in the system 300. The memory device 400 is coupled to the controller hub 315 through the memory controller 220 via an interface 316.

In one example embodiment, the controller hub 315 is a root hub, a root complex, or root controller in a Peripheral Component Interconnect Express (PCIe or PCIE) interconnection hierarchy. Examples of the controller hub 315 include a chipset, a memory controller hub (MCH), a northbridge, an interconnect controller hub (ICH) a southbridge, and a root controller/hub. The chipset may refer to two physically separate controller hubs, i.e., a memory controller hub (MCH) coupled to an interconnect controller hub (ICH). The MCH may be integrated with a host processor, while the controller hub 315 is used to communicate with I/O devices, in a similar manner as described below. In some example embodiments, peer-to-peer routing is optionally supported through the root complex or the controller hub 315.

In an embodiment, the controller hub 315 is coupled to a switch/bridge 319 through a serial link. Input/output modules 317 and 321, which may also be referred to as interfaces/ports 317 and 321, include/implement a layered protocol stack to provide communication between the controller hub 315 and the switch 319. In one example embodiment, multiple devices are capable of being coupled to the switch 319.

The switch/bridge 319 routes packets/messages from input-output devices 301, 302 and 303 upstream, i.e., up a hierarchy towards a root complex, to the controller hub 315 and downstream, i.e., down a hierarchy away from a root controller, from the processor 210 or the memory controller 220 to the input-output devices 301, 302 and 303. The switch 319, in one example embodiment, is referred to as a logical assembly of multiple virtual PCI-to-PCI bridge devices. The input-output devices 301, 302 and 303 include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. Although not specifically shown, the input-output devices 301, 302 and 303 may include a PCIe to PCI/PCI-X bridge to support legacy or other version PCI devices. Endpoint devices in PCIe may be classified as legacy, PCIe, or root complex integrated endpoints.

In an embodiment, the memory management unit 230 is also coupled to the controller hub 315 through a serial link 332. The I/O modules 331 and 318 are used to implement a layered protocol stack to communicate between the memory management unit 230 and the controller hub 315.

The memory management unit 230 may include a translation look aside buffer (TLB) configured to store the address mapping information referenced recently and/or frequently.

As described above, to support a memory access function based on locality information according to example embodiment, the host device 210 and the input-output devices 301, 302, and 303 having a direct memory access function may include the locality information generator LIG, and the memory controller 220 may include the request control circuit RCC and the command generator CGN.

Figure 20:
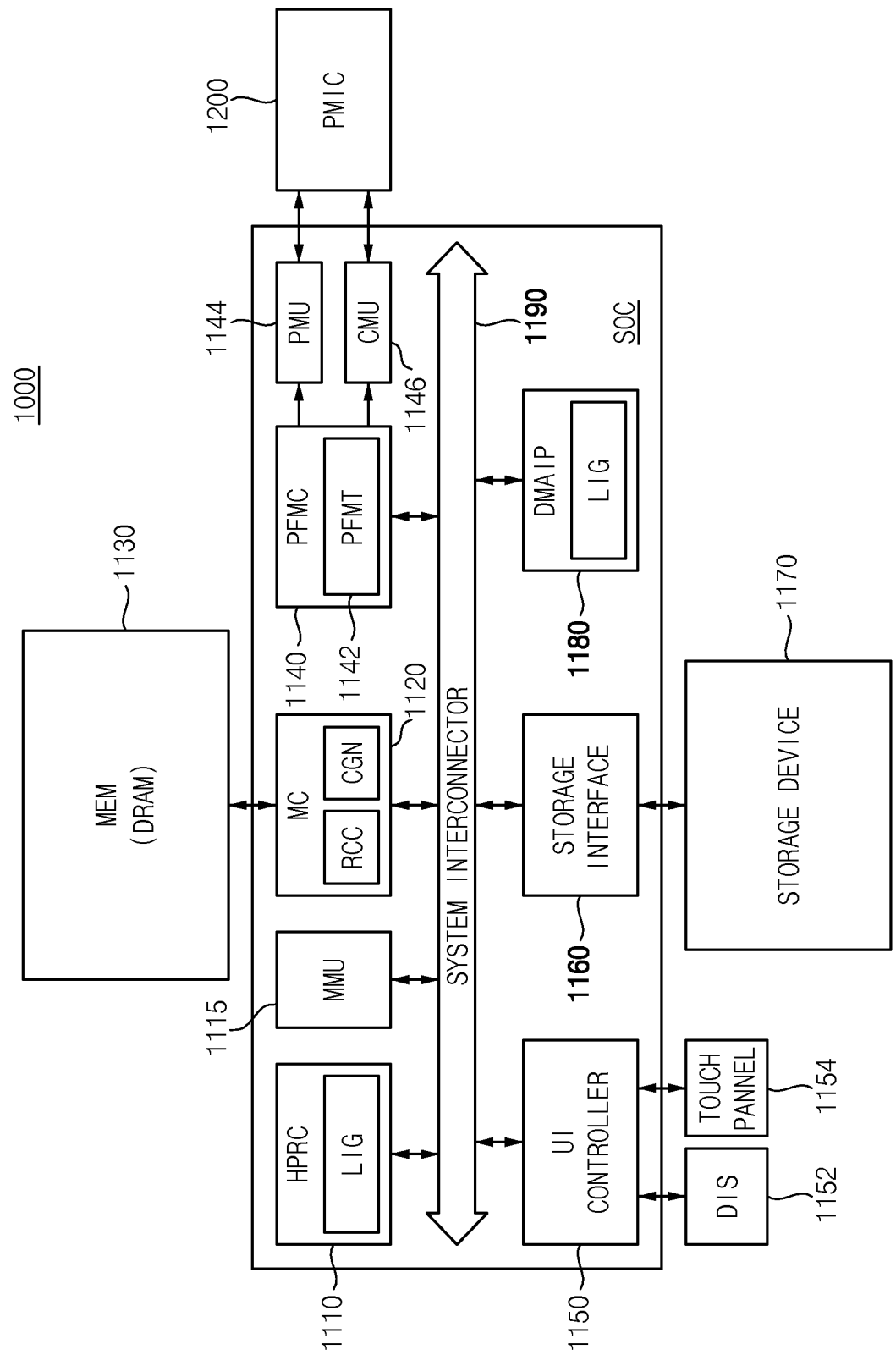
FIG. 20 is a block diagram illustrating an electronic system according to an example embodiment.

FIG. 20 is a block diagram illustrating an electronic system according to an example embodiment.

Referring to FIG. 20, an electronic system 1000 may include a system on chip (SoC), a working memory 1130, a display device (DIS) 1152, a touch panel 1154, a storage device 1170, a power management integrated circuit (PMIC) 1200, etc. The SoC may include a processor (HRPC) 1110, a memory management unit MMU 1115, a memory controller MC 1120, a performance controller 1140, a user interface controller (UI controller) 1150, a storage interface 1160, and a direct memory access device DMAIP 1180, a power management unit (PMU) 1144, a clock management unit (CMU) 1146, etc. It will be understood that components of the electronic system 1000 are not limited to the components shown in FIG. 20. For example, the electronic system 1000 may further include a hardware codec for processing image data, a security block, and the like.

The processor 1110 executes software (for example, an application program, an operating system (OS), and device drivers) for the electronic system 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The processor cores of the processor 1100 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the operating system (OS) may monitor the number of tasks in a task queue and the driving voltage and the driving clock of the processor 1110 at specific time intervals to control the processor 1110. In addition, a kernel of the operating system (OS) may control hotplug-in or hotplug-out of the processor 1110 with reference to the monitored information.

The memory controller 1120 provides interfacing between the working memory 1130 and the system-on-chip (SoC). The memory controller 1120 may access the working memory 1130 according to a request of the processor 1110 or another intellectual property (IP) block.

The operating system (OS) or basic application programs may be loaded into the working memory 1130 during a booting operation. For example, an OS image stored in the storage device 1170 is loaded into the working memory 1130 based on a booting sequence during booting of the electronic system 1000. Overall input/output operations of the electronic system 1000 may be supported by the operating system (OS). The working memory 1130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 1140 may adjust operation parameters of the system-on-chip (SoC) according to a control request provided from the kernel of the operating system (OS). For example, the performance controller 1140 may adjust the level of DVFS to enhance performance of the system-on-chip (SoC). Alternatively, the performance controller 1140 may generate frequency selection signals to control the frequencies of the processor cores according to a request of the kernel. In this case, the performance controller 1140 may include a performance table PFMT 1142 to set a driving voltage and a frequency of a driving clock therein. The performance controller 1140 may control the PMU 1144 and the CMU 1146, which together form a power managing circuit, connected to the PMIC 1200 to provide the determined driving voltage and the determined driving clock to each power domain.

The user interface controller 1150 controls user input and output from user interface devices. For example, the user interface controller 1150 may display a keyboard screen for inputting data to the display device 1152 according to the control of the processor 1110. Alternatively, the user interface controller 1150 may control the display device 1152 to display data that a user requests. The user interface controller 1150 may decode data provided from user input means, such as a touch panel 1154, into user input data.

The storage interface 1160 accesses the storage device 1170 according to a request of the CPU 1110. For example, the storage interface 1160 provides interfacing between the system-on-chip (SoC) and the storage device 1170. For example, data processed by the CPU 1110 is stored in the storage device 1170 through the storage interface 1160. Alternatively, data stored in the storage device 1170 may be provided to the CPU 1110 through the storage interface 1160.

The storage device 1170 is provided as a storage medium of the electronic system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The direct memory access device 1180 such as a graphics processing unit (GPU) may be provided as a separate intellectual property (IP) component to increase processing speed of a multimedia or multimedia data. For example, the direct memory access device 1180 may be provided as an intellectual property (IP) component to enhance processing performance of a text, audio, still images, animation, video, two-dimensional data or three-dimensional data. The direct memory access device 1180 may be implemented by one of the master devices 31-34.

A system interconnector 1190 may be a system bus to provide an on-chip network in the system-on-chip (SoC). The system interconnector 1190 may include, for example, a data bus, an address bus, and a control bus. The system interconnector 1190 may be implemented by the interconnect device 80. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

As described above, to support a memory access function based on locality information according to example embodiments, the processor 1110 and the direct memory access device 1180 may include a locality information generator LIG, and the memory controller 1120 may include a request control circuit RCC and a command generator CGN.

The inventive concept may be applied to any electronic devices and systems storing data. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. An electronic system comprising:
   a plurality of master devices configured to generate requests for memory access operations, each request including locality information set to one of a first value to indicate the corresponding request is to be executed continuously with another request among the requests or a second value different from the first value to indicate the corresponding request is not to be executed continuously with the another request;
   a memory controller configured to receive the requests from the plurality of master devices, determine an execution order of the requests based on the locality information of each of the requests, and sequentially generate commands to perform the memory access operations according to the execution order; and
   a memory device configured to receive the commands from the memory controller and perform the memory access operations based on the commands.

2. The electronic system of claim 1, wherein the memory controller determines the execution order based on the locality information such that the requests corresponding to a same row address of the memory device and received from one master device among the master devices are executed continuously.

3. The electronic system of claim 2, wherein the memory controller transfers one activate command to execute the requests corresponding the same row address of the memory device based on the one activate command.

4. The electronic system of claim 3, wherein the memory device activates a selected wordline of the memory device corresponding to the same row address based on the one activate command and maintains an activated state of the selected wordline while the requests corresponding to the same row address are executed continuously.

5. The electronic system of claim 2, wherein the memory controller determines the execution order such that a request received from another one of the master devices other than the one master device are executed after the requests corresponding to the same row address are executed continuously.

6. The electronic system of claim 1, wherein the memory controller determines the execution order based on depth information indicating a maximum number of requests that are received from one master device among the master devices and executed continuously.

7. The electronic system of claim 1, wherein the memory controller operates in one of a sequential mode in which the execution order is determined based on the locality information and a normal mode in which the execution order is determined without considering the locality information.

8. The electronic system of claim 1, wherein the memory controller comprises:
   a plurality of request queues configured to store requests received from the plurality of master devices such that each request queue sequentially stores requests received from each master device; and
   a request arbitration circuit configured to receive one of the stored requests output from the plurality of request queues and sequentially output requests that are received by the request arbitration circuit.

9. The electronic system of claim 8, wherein the request arbitration circuit, based on the locality information, continuously receives and outputs requests output from one request queue among the request queues and stops receiving requests output from the request queues other than the one request queue while the request arbitration circuit continuously receives and outputs the requests output from the one request queue.

10. The electronic system of claim 9, wherein based on depth information indicating a maximum number of requests that are received from one master device among the master devices and executed continuously, the request arbitration circuit limits a number of the requests that are received from the one master device and executed continuously to be smaller than or equal to the maximum number.

11. The electronic system of claim 9, wherein the request arbitration circuit, after continuously receiving and outputting the requests output from the one request queue, receives and outputs requests output from the request queues other than the one request queue according to a round robin scheme.

12. The electronic system of claim 8, wherein, in a normal mode in which the execution order is determined without considering the locality information, the request arbitration circuit receives and outputs requests output from the plurality of request queues one by one according to a round robin scheme.

13. The electronic system of claim 8, wherein requests output from the plurality of request queues are transferred to the request arbitration circuit according to a handshake scheme using a valid signal and a ready signal.

14. The electronic system of claim 8, wherein the memory controller further comprises: a command generator configured to sequentially generate the commands based on the requests sequentially output from the request arbitration circuit.

15. The electronic system of claim 1, wherein each master device of the plurality of master devices, with respect to a preceding request and a succeeding request that are generated sequentially, sets the locality information in the preceding request to the first value when continuous execution of the preceding request and the succeeding request is required, and sets the locality information in the preceding request to the second value different from the first value when the continuous execution of the preceding request and the succeeding request is not required.

16. The electronic system of claim 15, wherein the memory controller determines the execution order such that the preceding request and the succeeding request are executed continuously when the locality information in the preceding request has the first value, and a request received from another master device is executed after the preceding request when the locality information in the preceding request has the second value.

17. The electronic system of claim 1, wherein the memory device is a dynamic random access memory (DRAM) device.

18. A memory controller comprising:
   a first request queue configured to receive first requests transferred from a first master device and store the first requests, each first request including first locality information set to one of a first value to indicate the corresponding first request is to be executed continuously with another first request among the first requests or a second value different from the first value to indicate the corresponding first request is not to be executed continuously with the another first request;
   a second request queue configured to receive second requests transferred from a second master device and store the second requests, each second request including second locality information set to one of the first value to indicate the corresponding second request is to be executed continuously with another second request among the second requests or the second value to indicate the corresponding second request is not to be executed continuously with the another second request; and
   a request arbitration circuit configured to receive some of the first requests output from the first request queue and some of the second requests output from the second request queue and sequentially output the requests that are received by the request arbitration circuit such that the output requests corresponding to a same row address of the memory device are executed continuously.

19. The memory controller of claim 18, wherein the request arbitration circuit, based on the first locality information in the first requests, continuously receives and outputs the first requests output from the first request queue and stops receiving the second requests output from the second request queue while the request arbitration circuit continuously receives and outputs the first requests output from the first request queue, and wherein the request arbitration circuit, based on the second locality information in the second requests, continuously receives and outputs the second requests output from the second request queue and stops receiving the first requests output from the first request queue while the request arbitration circuit continuously receives and outputs the second requests output from the second request queue.

20. A method of controlling memory access, comprising:
   generating, by a plurality of master devices, requests for memory access operations, each request including locality information set to one of a first value to indicate the corresponding request is to be executed continuously with another request among the requests or a second value different from the first value to indicate the corresponding request is not to be executed continuously with the another request;
   determining, by a memory controller, an execution order of the requests received from the plurality of master devices based on the locality information of each of the requests;

sequentially generating, by the memory controller, commands to perform the memory access operations according to the execution order; and performing, by a memory device, the memory access operations based on the commands received from the memory controller.

\* \* \* \* \*